US012165657B2

(12) United States Patent
Guo et al.

(10) Patent No.: US 12,165,657 B2
(45) Date of Patent: Dec. 10, 2024

(54) CHANNEL IDENTIFICATION OF MULTI-CHANNEL AUDIO SIGNALS

(71) Applicant: Dolby Laboratories Licensing Corporation, San Francisco, CA (US)

(72) Inventors: Yanmeng Guo, Beijing (CN); Kai Li, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 183 days.

(21) Appl. No.: 17/639,286

(22) PCT Filed: Aug. 27, 2020

(86) PCT No.: PCT/US2020/048128
§ 371 (c)(1),
(2) Date: Feb. 28, 2022

(87) PCT Pub. No.: WO2021/041623
PCT Pub. Date: Mar. 4, 2021

(65) Prior Publication Data

US 2022/0319526 A1 Oct. 6, 2022

Related U.S. Application Data

(60) Provisional application No. 62/912,279, filed on Oct. 8, 2019.

(30) Foreign Application Priority Data

Aug. 30, 2019 (WO) ................ PCT/CN2019/103813
Oct. 22, 2019 (EP) .................................... 19204516

(51) Int. Cl.
*G10L 19/008* (2013.01)
*H04R 3/12* (2006.01)
(Continued)

(52) U.S. Cl.
CPC .................................. *G10L 19/008* (2013.01)

(58) Field of Classification Search
CPC . G10L 19/008; G10L 19/0208; G10L 19/018; G10L 19/032; G10L 25/51;
(Continued)

(56) References Cited

U.S. PATENT DOCUMENTS 8,000,485 B2 8/2011 Walsh
8,082,050 B2 12/2011 Schmidt
(Continued)

FOREIGN PATENT DOCUMENTS

CN 101816040 A 8/2010
CN 107113526 A 8/2017
(Continued)

OTHER PUBLICATIONS

Cabot, Richard C. "Automated Assessment of Surround Sound" AES Convention published Oct. 1, 2009.
(Continued)

*Primary Examiner* — Leshui Zhang

(57) ABSTRACT

A method for channel identification of a multi-channel audio signal comprising X>1 channels is provided. The method comprises the steps of: identifying, among the X channels, any empty channels, thus resulting in a subset of Y≤X non-empty channels; determining whether a low frequency effect (LFE) channel is present among the Y channels, and upon determining that an LFE channel is present, identifying the determined channel among the Y channels as the LFE channel; dividing the remaining channels among the Y channels not being identified as the LFE channel into any number of pairs of channels by matching symmetrical channels; and identifying any remaining unpaired channel among the Y channels not being identified as the LFE channel or divided into pairs as a center channel.

19 Claims, 7 Drawing Sheets

(51) Int. Cl.
*H04S 3/00* (2006.01)
*H04S 7/00* (2006.01)

(58) Field of Classification Search
CPC ......... G10L 25/00; G10L 25/78; G10L 25/48; G10L 15/04; G10L 21/0272; G06F 16/683; G10K 15/12; H03G 3/30; H03G 5/165; H04R 5/04; H04R 2420/01; H04R 2420/03; H04S 3/008; H04S 3/00; H04S 3/12; H04S 7/00; H04S 7/30; H04S 5/005
See application file for complete search history.

(56) References Cited

U.S. PATENT DOCUMENTS

| | | | | |
|---|---|---|---|---|
| 8,842,842 | B2 | 9/2014 | Eppolito | |
| 9,578,418 | B2 | 2/2017 | Le Nerriec | |
| 9,911,423 | B2 | 3/2018 | Vasilache | |
| 9,936,327 | B2 | 4/2018 | Herre | |
| 10,136,236 | B2 | 11/2018 | Chon | |
| 10,200,789 | B2 | 2/2019 | Jeanne | |
| 2008/0114478 | A1 | 5/2008 | Wu | |
| 2012/0195433 | A1* | 8/2012 | Eppolito | H04S 3/008 381/1 |
| 2014/0355769 | A1* | 12/2014 | Peters | H04S 7/40 381/23 |
| 2015/0348564 | A1* | 12/2015 | Paulus | G10L 19/008 704/500 |
| 2016/0196830 | A1* | 7/2016 | Riedmiller | G10L 19/26 704/500 |
| 2016/0232901 | A1* | 8/2016 | Ghido | G10L 19/008 |

FOREIGN PATENT DOCUMENTS

| | | | |
|---|---|---|---|
| CN | 107170465 | B | 7/2020 |
| EP | 2866227 | A1 | 4/2015 |
| EP | 2845191 | B1 | 3/2019 |
| EP | 3373295 | B1 | 2/2020 |
| JP | 2011066868 | A | 3/2011 |
| JP | 2014522155 | A | 8/2014 |
| KR | 20060049980 | A | 5/2006 |
| WO | 2016036637 | A2 | 3/2016 |
| WO | 2018234623 | A1 | 12/2018 |

OTHER PUBLICATIONS

Recommendation ITU-R BS.775-3 (Aug. 2012) "Multichannel stereophonic sound system with and without accompanying picture".
The Recording Academy's Producers & Engineers Wing Recommendations For Surround Sound Production, 2004.

* cited by examiner

- ✓ L C R Ls Rs LFE (C|24/FILM)
- L R C LFE Ls Rs (SMPTE/ITU)
- L R Ls Rs C LFE (DTS/ProControl MONITORING
- L x C x R Ls Rs LFE (D-COMMAND/D-CONTROL)

CHANNEL IDENTIFICATION OF MULTI-CHANNEL AUDIO SIGNALS

CROSS-REFERENCE TO RELATED APPLICATIONS

This application is a national stage application under 35 U.S.C. 371 of International Application Number PCT/US2020/048128, filed Aug. 27, 2020, which claims priority to PCT Patent Application No. PCT/CN2019/103813, filed Aug. 30, 2019, U.S. Provisional Application No. 62/912,279, filed Oct. 8, 2019, and European Patent Application No. 19204516.9, filed Oct. 22, 2019, each of which is hereby incorporated by reference in its entirety.

TECHNICAL FIELD

The present disclosure relates to the field of channel identification, and in particular to methods, devices and software for channel identification for surround sound systems.

BACKGROUND

An audio signal is usually converted several times before it reaches a multi-channel system. During these conversions, the channels may be swapped or damaged. The surround sound process does not normally contain a function for channel identification, abnormal channel detection or channel swap detection, and the default layout setting is usually used. If the channel layout of input sound data does not match the setting in processing, the channels are swapped.

The current standard is for the swapped channel index to be saved as metadata into the surround sound data, which makes the metadata unreliable and harmful for the future process. If the surround sound contains some abnormal channels, the error may not be detected, so it may pass on to the next process.

There is thus a need for improvements in this context.

SUMMARY OF THE INVENTION

In view of the above, it is thus an object of the present invention to overcome or mitigate at least some of the problems discussed above. In particular, it is an object of the present disclosure to provide a channel layout identification that is based on the audio signal of the channels instead of the metadata added by sound codecs. This character may make the identification independent of the coding formats or channel number and immune to the mismatched metadata. Spatial auditory impression is important for multi-channel surround sound, and it is usually generated by panning the sound sources through mixing. The channel identification method described herein extracts the spatial information to recover the channel layout. Further and/or alternative objects of the present invention will be clear for a reader of this disclosure.

According to a first aspect of the invention, there is provided a method for channel identification of a multi-channel audio signal comprising X>1 channels, the method comprising the steps of: identifying, among the X channels, any empty channels, thus resulting in a subset of Y≤X non-empty channels; determining whether a low frequency effect (LFE) channel is present among the Y channels, and upon determining that an LFE channel is present, identifying the determined channel among the Y channels as the LFE channel; dividing the remaining channels among the Y channels not being identified as the LFE channel into any number or pairs of channels by matching symmetrical channels; and identifying any remaining unpaired channel among the Y channels not being identified as the LFE channel or divided into pairs as a center channel.

By the term "channel identification" should, in the context of present specification, be understood that when channels of an audio signal are swapped and/or damaged, channel identification may be used to find the correct settings for the audio signal to restore the audio signal to its original intent. The term "channel identification" comprises functions such as abnormal channel detection and/or channel swap detection.

By the term "multi-channel audio signal" should, in the context of present specification, be understood an audio signal with at least two channels of audio. A channel of audio is a sequence of sound signals, preferably different to at least another channel of the multi-channel audio signal. The audio signal may be in the format of e.g. an audio file, an audio clip, or an audio stream.

By the term "empty channels" should, in the context of present specification, be understood a channel of audio with sound signal content below a certain threshold. The threshold may e.g. be a total energy content threshold or an average energy content threshold.

By the term "low frequency effect (LFE) channel" should, in the context of present specification, be understood a channel of audio with sound signal content substantially, primarily, or only comprising energy below a frequency threshold such as 200 Hz.

By the term "symmetrical channels" should, in the context of present specification, be understood channels of audio with sufficiently similar and/or symmetric sound signal content. Symmetric sound signal content may e.g. comprise similar background sound and different foreground sound, similar base sounds (e.g. low-frequency) and different descant sounds (e.g. high frequency), or vice versa respectively. Symmetric sound signal content may further comprise synchronized sound such as different parts of a single chord or a sound starting in one channel and ending in another.

By the term "center channel" should, in the context of present specification, be understood a channel of audio substantially independent of the other channels, comprising the most general content of the other audio channels. The present disclosure focuses on embodiments with only one center channel, which is the current standard for multi-channel audio signals, however if current standards are developed the method according to the first aspect may be adjusted accordingly.

The inventors have realized that the identification of the center channel is more difficult than many of the other steps. Accordingly, computational power may be saved by doing the center channel identification step as the last step in the channel identification method, thereby reducing the computation into finding the left-over channel after all other channels have been identified and optionally verifying it as the center channel.

Similar efficiencies related to sequencing (i.e. the specific order of the steps of the channel identification method described herein) will be discussed regarding specific embodiments, however many of them are generally applicable to most embodiments.

Beyond saving computational power, sequencing may further be used to increase the reliability of the method by starting with the most reliable methods.

In preferred embodiments, sequencing may be used to both conserve computational power and increase the reliability of the method.

According to some embodiments, the method further comprises a step of differentiating the channels divided into pairs between a front pair, side pair, back pair and/or any other positional pair, wherein the channel pair differentiation step comprises calculating an inter-pair level difference between each two pairs; the inter-pair level difference being proportional to a decibel difference of a sum of the sub-band sound energies of each pair; wherein the pair with the relatively highest level is differentiated as the front pair.

Many multi-channel audio signals comprise more than one channel pair; such as 5.1, which comprises a front pair and a back pair. It is therefore beneficial for the method for channel identification to be able to differentiate between positional pairs and correctly identify them as such. The inter-pair level difference is an efficient and accurate measurement for differentiating between positional pairs.

According to some embodiments, the channel pair differentiation step further comprises selecting one or more segments of the signal for each channel in each pair where an absolute inter-pair level difference is above an absolute threshold; and calculating the inter-pair level difference of the pairs using only these segments, wherein if the relatively highest average inter-pair level difference is below a level threshold, the step of calculating the inter-pair level difference of the pairs is repeated with a higher absolute threshold.

The level difference between the pairs is not always high enough, as a difference below e.g. 2 dB may not be informative. It is therefore beneficial to select segments of the signal with content that may produce a larger level difference between the pairs. If the selection of segments does not result in a high enough average inter-pair level difference, a selection with a higher absolute threshold may achieve this.

The absolute inter-pair level difference is checked in points in these embodiments, hence the selected segments may contain some isolated frames.

In other embodiments, the absolute values are checked in segments, with either the maximum absolute inter-pair level difference is compared to the absolute threshold or the average absolute inter-pair level difference is compared to the absolute threshold. This results in the selected segments being quantized by the segment lengths checked.

According to some embodiments, if the relatively highest average inter-pair level difference is below a level threshold and the absolute threshold is higher than a maximum threshold, the pair with the relatively highest directional consistency is differentiated as the front pair, wherein the directional consistency is a measurement of the similarity of two channels in the time domain, which relates to the sound image direction, which in turn implies the phase difference between the channels.

In these embodiments, the selection of segments has failed to produce a high enough average inter-pair level difference. As such, directional consistency is instead used to differentiate the pairs. The pair with the highest directional consistency is differentiated as the front pair. The signals in front pair are usually time-aligned to represent directional sound sources, so they have higher correlation and lower delay, hence higher directional consistency. This means that there are more identical components in the front pair compared to the back pair.

The selection of segments has failed, because the highest average inter-pair level difference has not reached a high enough level to go beyond the level threshold and the absolute threshold is so high that the segments above it are not long enough to be able to calculate an inter-pair level difference. If the total length of the selected segments is shorter than e.g. 20% (or any other defined percentage) of the non-silence signal length or shorter than e.g. 1 minute (or any other defined length), the useful signal may be considered as too short.

The directional consistency measures the proportion of identical components in the signal by comparing sample values in the time domain at different points. Higher similarity between the signal in two channels means higher correlation and lower delay. The paired channels usually have correlated signals, and the signal in front pairs are usually time-aligned to represent directional sound sources.

As an alternative, combined directional consistency with the identified center channel may be used to differentiate the pairs. The pair with direction closest to the center channel is also closest to the center channel (i.e. the pair identified as the front pair).

According to some embodiments, the empty channel identification step further comprises measuring sound energy in each channel among the X channels, wherein a channel is identified as empty if its total sound energy is below an energy threshold.

The sound energy is usually measured using sub-bands of each channel by summing the amplitudes of each frequency in each sub-band. This results in an efficient way of identifying empty channels, even if noise due to coding or otherwise may be present in the empty channels.

The energy threshold may e.g. be −80 to −60 dB, preferably −70 dB. Instead of or in addition to measuring the total sound energy, a mean sound energy in time segments may be measured, wherein the time segments may be between 1 and 10 seconds.

Empty channels may be the result of e.g. abnormal devices, stereo advertising slots during a multi-channel TV program and multi-channel surround sound that is upmixed from originally stereo or mono sound.

According to some embodiments, it is determined that an LFE channel is present among the Y channels if the sum of sub-band sound energy in the low frequency region of a channel, being any sub-band below 200 Hz, is significantly higher than the sum of sub-band sound energy in all the other frequency regions in that channel.

This is beneficial in that it is unlikely to miss the LFE channel. 200 Hz is a cut-off of the low frequency region intended to ensure that the LFE channel is not missed while also reducing false positives. Typically the threshold is 120 Hz, but it may preferrably be set to a higher value because normal channels carry signal in much wider frequency band.

According to some embodiments, the matching of symmetrical channels in the channel pair dividing step further comprises calculating inter-channel spectral distances between the channels using calculated sound energy distribution and variance of each channel; the inter-channel spectral distance being a normalized pairwise measurement of the distance between two matching sound energy sub-bands in each channel, summed for a plurality of sub-bands; and matching the channels with shortest distance to each other as a pair.

Inter-channel spectral distance is a simple and accurate measurement of symmetry. A mathematical distance is a measurement of similarity that may be weighted in various ways. The distance measure used may be Euclidean Distance, Manhattan distance and/or Minkowski distance.

According to some embodiments, the channel pair dividing step continues pairing up any unpaired channel among the Y channels not being identified as the LFE channel until fewer than two channels remain.

There may be more than two pairs of channels, such as a front pair and a back pair. Hence, if more than two channels remain it is likely that more channel pairs are among them, and more pairs are possible to divide.

According to some embodiments, the channel pair dividing step further comprises assigning the first received channel of the multi-channel audio signal within each pair as the left channel and the last listed channel within each pair as the right channel.

It is customary to list the left channel in each pair before the right channel in a multi-channel audio signal, so by assuming this is always the case, the method is more efficient.

According to some embodiments, the method further comprises calculating a confidence score for any of the results of the steps of the method, the confidence score being a measurement of how reliable the result is, wherein if the time duration of the multi-channel audio signal is below a certain time duration threshold, the confidence score is multiplied by a weight factor less than one, so that a time duration less than the time duration threshold leads to a less reliable result.

It may be useful to know how reliable each result of the steps of the method is in order to diagnose mistakes or measure improvements. If the time duration of the multi-channel audio signal is too low, the identifications made are unreliable as too little data may be used in the calculations. Hence a weight factor may be used.

According to some embodiments, the method further comprises a display step wherein a calculated confidence score is displayed on a display; and wherein a warning is displayed if the calculated confidence score is below a confidence threshold and/or if the identified channel layout is different to the setting layout of the user.

The display is beneficial in that a user may receive feedback regarding the reliability of the method. This allows the user to make an informed decision about whether the method's identification is more reliable than the current settings. The warning is beneficial in that it may alert the user to take action in order to e.g. stop the method, redo the method or improve the method by e.g. increasing a bit streaming rate and/or fixing a glitch upstream. If the identified channel layout is different to the setting layout of the user, the settings and/or the identified channel layout may be incorrect, which may require action, e.g. by a device or a user.

According to some embodiments, the method further comprises a step of applying the identified channel layout to the multi-channel audio signal.

The applying step may comprise: changing the order of the channels of the multi-channel audio signal; re-directing the channels to the identified playback source, i.e. so that the left channel is output by the left speaker; or any other physical and/or digital manipulation of the multi-channel audio signal to conform to the identified layout being a result of the method for channel identification.

According to some embodiments, the channel layout identified by the method is applied in real time to the multi-channel audio signal as it is being streamed to a speaker system.

As the proposed method is very computationally efficient, it may be applied in real time without any significant delay to the playback.

The first results may be inaccurate, and the confidence scores low, and then they increase with more data acquired as the audio signal plays.

According to some embodiments, at least one of the steps of the method uses machine learning based methods, wherein the machine learning based methods are a decision tree, Adaboost, GMM, SVM, HMM, DNN, CNN and/or RNN.

Machine learning may be used to further improve the efficiency and/or the reliability of the method.

According to a second aspect of the invention, there is provided a device configured for identifying channels of a multi-channel audio signal, the device comprising circuitry configure to carry out the method according to the first aspect of the invention.

According to a third aspect of the invention, there is provided a computer program product comprising a non-transitory computer-readable storage medium with instructions adapted to carry out the method according to the first aspect of the invention when executed by a device having processing capability.

The second and third aspect may generally have the same features and advantages as the first aspect.

It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

The present disclosure generally relates to the problem of swapped or damaged channels of a multi-channel audio signal. In order to restore the channels to their intended state, the inventors have found that channel identification may be used. In the following, the multi-channel audio signal is a 5.1 audio signal. However, this is just by way of example and the methods and systems described herein may be employed for channel identification of any multi-channel audio signal, such as for example 7.1.

Figures 1, 2:
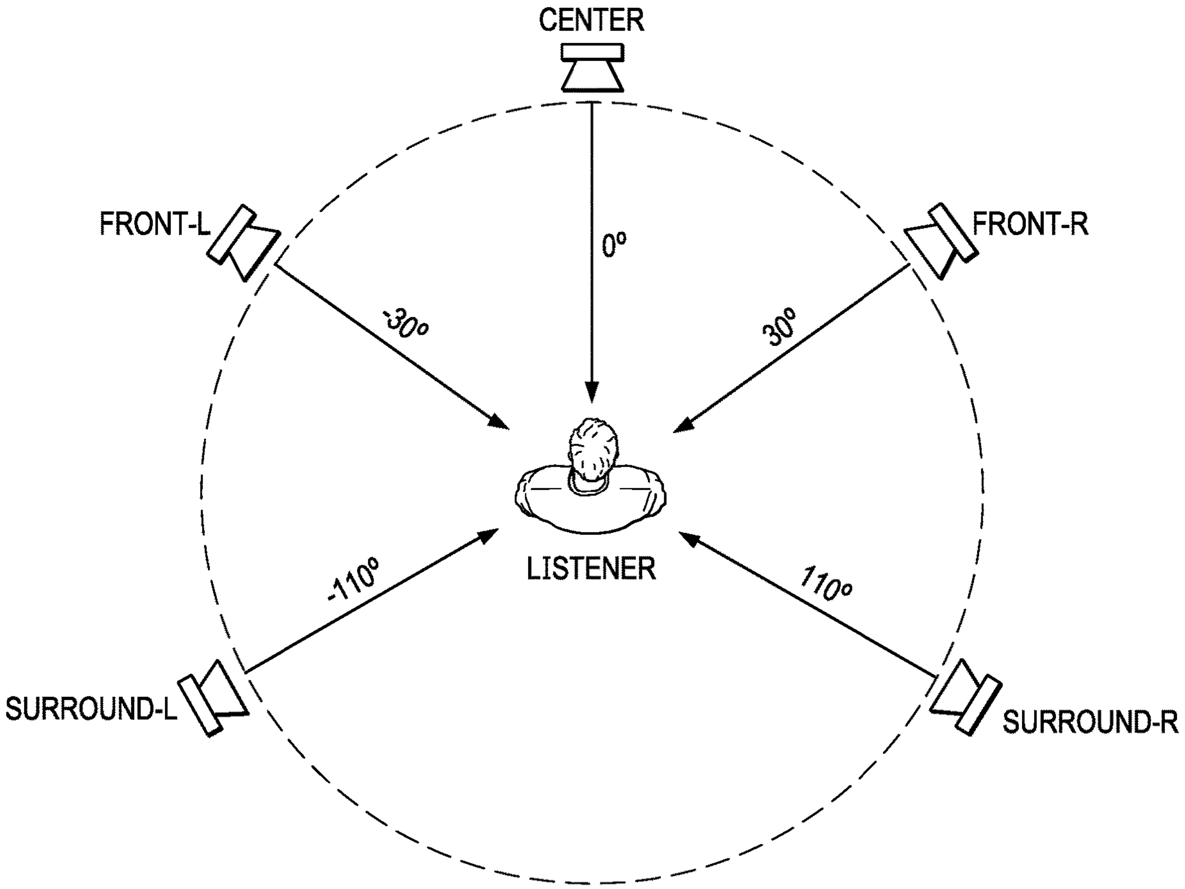
FIG. 1 shows a menu of different formats of surround sound according to some embodiments.
FIG. 2 shows a channel layout of a 5.1 surround sound system according to some embodiments.

FIG. 1 schematically shows a menu of a workstation for multi-channel sound processing. It is an example of different widely-used formats of 5.1 channels.

Current standard practise involves simply choosing a default format and if the channel layout of input sound data does not match the settings in processing, the channels are swapped. The swapped channel index may be saved as metadata into the surround sound data, so that they are continually swapped correctly. However, if a future system uses a different default, the metadata becomes unreliable and harmful for the future process.

If the multi-channel audio signal further comprises damages channels, the current standard does not detect this abnormality, hence errors will propagate to future systems.

FIG. 2 shows a typical layout of a 5.1 surround sound system. If any of the speakers of this system have their contents swapped or any channel is damaged or emptied, the audio experienced by the listener is different to the original intention. E.g. if the front-R and surround-R speaker contents are swapped, the symmetry of the speaker pairs is broken or if the front-L speaker content is empty, important parts of total sound image may be missing. The sound image in the original surround sound data cannot be reproduced and the spatial impression is confused and becomes annoying to the listener.

The abnormal channel(s) may be detected because their index or the whole layout may look abnormal. Any swapped channels may also be found by comparing the detected channel layout and the channel layout in a user's setting.

The term surround pair and back pair will be used interchangeably throughout this disclosure in order to generalize the disclosure for further possible positional pairs, such as in a 7.1 surround sound system where the surround pair is replaced by a side pair and a back pair.

Figure 3:
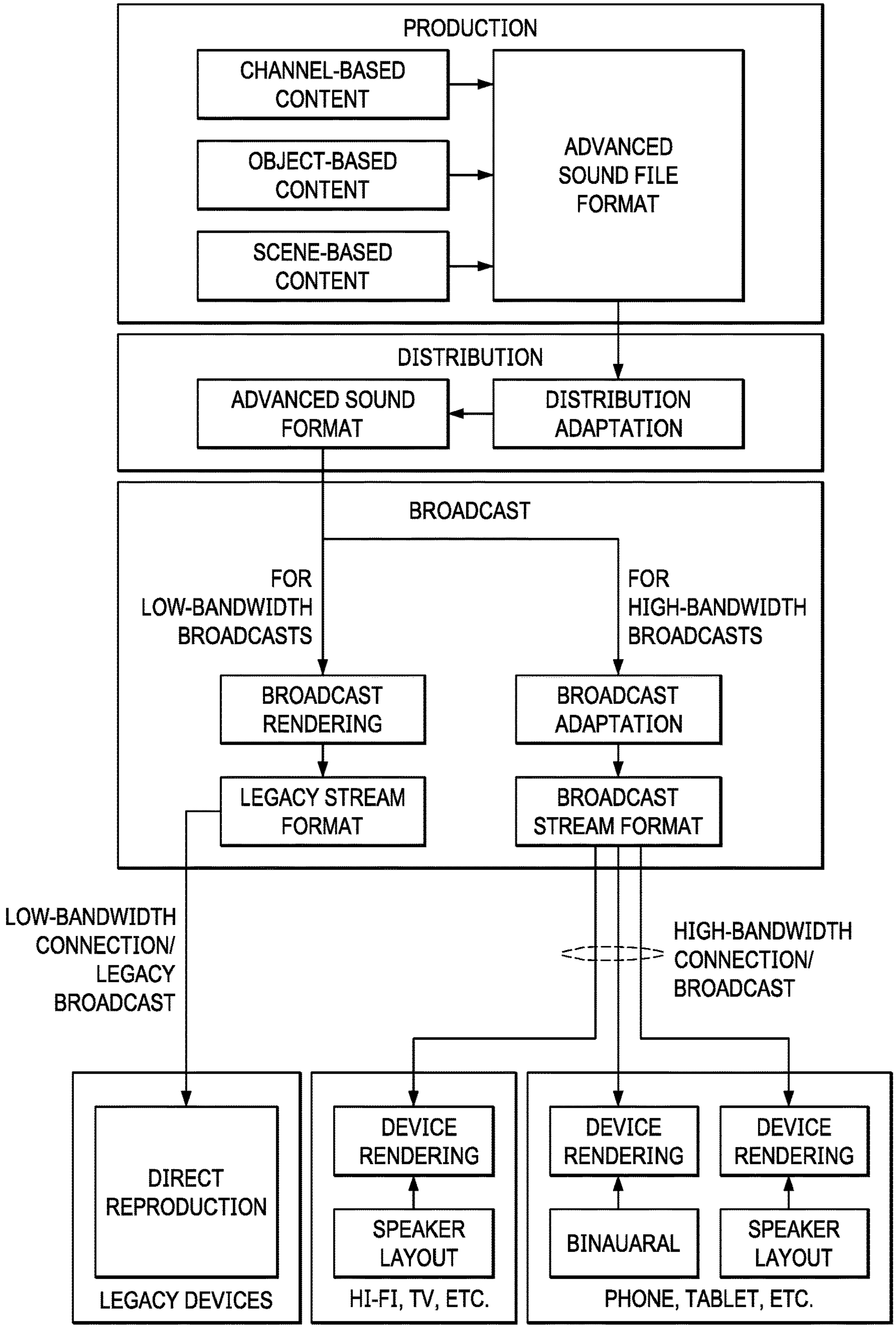
FIG. 3 shows a flowchart of a broadcast chain for sound according to some embodiments.

FIG. 3 shows an example of an advanced sound system of a typical broadcast chain. This example shows the flow of surround sound data in a typical broadcast chain, and it means that the surround sound is converted several times during a typical work flow before playback. As discussed previously regarding FIG. 1, errors in metadata may propagate through such a work flow. Further, the channels may be swapped or damaged in each of the processes of the work flow.

The flow starts at production, which comprises channel-based content, object-based content and/or scene-based content contributing to an advanced sound file format. The advanced sound file format is output by the production and input into a distribution.

The distribution comprises distribution adaptation of the advanced sound file format into an advanced sound format. The advanced sound format is output by the distribution and input into a broadcast.

The broadcast comprises a fork between high-bandwidth broadcasts and low-bandwidth broadcasts. The low-bandwidth broadcasts broadcast renders the advanced sound format into a legacy stream format. The legacy stream format is output by the broadcast and input into a low-bandwidth connection/legacy broadcast.

The low-bandwidth connection/legacy broadcast comprises direct reproduction to legacy devices.

The high-bandwidth broadcasts broadcast adapts the advanced sound format into a broadcast stream format. The broadcast stream format is output by the broadcast and input into a high-bandwidth connection/broadcast.

The high-bandwidth connection/broadcast comprises either device rendering into either a speaker layout or a binaural layout for a Hi-Fi, TV, phone, tablet, etc.

As the metadata is unreliable, the inventors have found a method for channel identification that only relies on the audio content of the multi-channel audio signal to detect abnormal channels. The detector may detect the layout of the channels based on all the available data, and may further provide the estimated channel indexes with confidence scores to show the reliability. The abnormal channel(s) may be detected because their index or the whole layout may look abnormal. Any channel swap may also be found by comparing the detected channel layout with the channel layout in the user's setting.

In general, the audio data comprises: a frontal sound image coming from a center channel and possibly a frontal channel pair, where the directional stability is maintained for the most part of the time duration; the left and right channels, which carry balanced sound information, and the channels may be treated as pairs; the rear channels carry information that may enhance the whole sound image. The audio data may further comprise a separate low frequency channel to round out the sound image with low frequencies. If the multi-channel surround sound accompanies a video or an image, the sound image preferably coincidences with the visual image and the designed listening area.

By basing the channel identification on the audio data, the identification is independent of the coding formats or channel number, and is immune to mismatched metadata. Spatial auditory impression is important for multi-channel surround sound, and it is usually generated by panning the sound sources through mixing. The channel identification extracts the spatial information to recover the channel layout.

Figure 4:
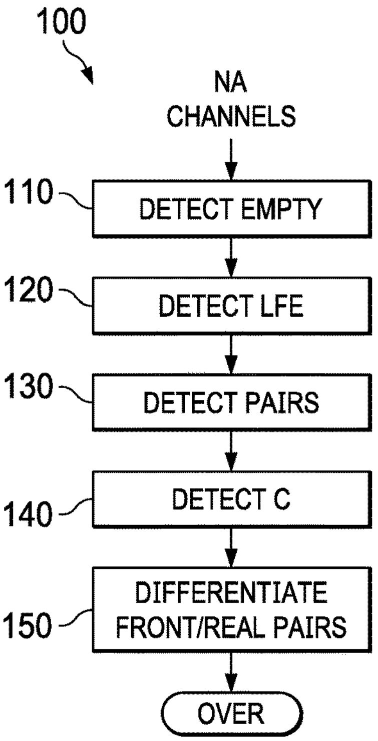
FIG. 4 shows a diagram of the steps of a method for channel identification according to some embodiments.

FIG. 4 shows a diagram of an embodiment of the channel layout identification method 100. The method 100 comprises five steps that are performed in a specific order in order to minimize the computation required.

The method 100 starts with a multi-channel audio signal comprising X>1 non-identified channels. The first step is the empty channel identification step 110, as this is the least computationally demanding step.

The empty channel identification step 110 comprises measuring sound energy in each channel among the X channels in order to identify any empty channels, thus resulting in a subset of Y≤X non-empty channels.

The sound energy in each channel among the X channels may be measured in short-term, medium-term and/or long-term time duration and may be measured in a temporal, spectral, wavelet and/or auditory domain.

The different terms may be useful depending on the content of the channel.

The temporal domain comprises information about sound pressure values at different time points. The spectral domain comprises frequency information in spectral components, reached by transforming the content of the channel. The wavelet domain comprises time and frequency information in wavelet multi-resolution decomposition, reached by transforming the content of the channel. The auditory domain is the normal, untransformed domain that comprises information about the auditory nerve responses caused by hearing the signal.

The auditory domain may be used for channel identification. For example, auditory filter based decomposition like mel/bark filter banks may be used in each method step. In such embodiments, the specific loudness of each critical band is used to replace the sub-band energy in equation 1.

Wavelet transform is also applicable for signal decomposition, and it may provide the time-frequency features for the following method step.

A channel is identified as empty if: its total sound energy is below an energy threshold; or each of its sub-band sound energies are below an energy threshold. A sub-band is a range of energies.

One definition of a sub-band energy is:

$$E_{b,c}(l)=\Sigma_{k=f_l}^{f_h}X_c(k,l) \quad \text{(equation 1)},$$

where $E_{b,c}(l)$ is the sub-band energy of channel c in band b of frame l, l=1 . . . L, and L is the total number of frame, $X_c(k,l)$ is the spectral amplitude of frequency index k in frame l of channel c, and $f_l$, $f_h$ are the lowest and highest index of the frequency bin of band b respectively.

This definition is measured in short-term. For a time block of one frame or several frames, both the mean value and standard variance of $E_{b,c}(l)$ in is calculated. If for both the mean and variance are below certain thresholds for all time blocks, the sub-band b of channel c is detected as empty.

Alternatives include spectral-related measures, such as band-pass filtered signal and auditory rate-map.

The identification of an empty channel may be stored using metadata.

The LFE determination step 120 is next and comprises determining whether a low frequency effect (LFE) channel is present among the Y channels, and upon determining that an LFE channel is present, identifying the determined channel among the Y channels as the LFE channel.

The LFE determination step 120 may further comprise using the sound energy in each channel among the Y channels measured in the empty channel identification step 110 to determine whether an LFE channel is present. This conserves calculation effort.

The LFE determination step 120 may further comprise measuring the frequency bands where sound energy above an energy threshold is present in each channel among the Y channels. This does not require measuring of sound energy in the empty channel identification step 110.

The frequency bands where sound energy above an energy threshold is present in each channel among the Y channels may be measured in short-term, medium-term and/or long-term time duration.

The determination that an LFE channel is present among the Y channels may comprise checking if the sum of sub-band sound energy in the low frequency region of a channel is significantly higher than the sum of sub-band sound energy in all the other frequency regions in that channel. This is beneficial in that it is unlikely to miss the LFE channel.

As an alternative to summing the sub-band sound energy, e.g. averages and/or maximum values may be used.

Any such channel may be identified as the LFE channel. The low frequency region may e.g. be any sub-band below 400 Hz, 300 Hz, 200 Hz, 120 Hz, 100 Hz, or 50 Hz. The low frequency region may be determined based on the content of the audio signal.

In practise, any frequency between 200 Hz and 2000 Hz may belong to the low frequency region or high frequency region depending on the embodiment. Thus, the low frequency region may be determined based on the specific embodiment. Alternatively, it may be beneficial to only look at sub-bands below 200 Hz and above 2000 Hz.

The highest frequency of the signal may depend on the sample rate of the signal. Hence, it may be beneficial to only look at sub-bands between 2000 Hz and half of the sample rate.

The determination that an LFE channel is present among the Y channels may comprise checking if a channel only comprises sub-band sound energy above an energy threshold in frequency regions below a frequency threshold. This is beneficial in that it will likely not detect any channel beyond the LFE channel, however it may not detect the LFE channel if it e.g. contains noise or has a different low frequency region than expected. In some embodiments, only any such channel is identified as the LFE channel.

The frequency threshold may e.g. be 2000 Hz, 1000 Hz, 500 Hz, 400 Hz, 300 Hz, 200 Hz, 120 Hz, 100 Hz, or 50 Hz or may be determined based on the content of the audio signal.

If several LFE channels are determined to be present among the Y channels, only one may be identified as the LFE channel according to a hierarchy of the feature(s) used to determine if an LFE channel is present.

As most multi-channel audio signals only have at most one LFE channel, a hierarchy may be used to determine which of several possible LFE channels is identified as the LFE channel. The hierarchy may e.g. comprise a harder threshold or the biggest difference in sub-band sound energy between the low frequency region and the other frequency regions.

The identified LFE channel may be stored using metadata.

The channel pair dividing step 130 is next and comprises dividing the remaining channels among the Y channels not being identified as the LFE channel into any number or pairs of channels by matching symmetrical channels. The channel pair dividing step 130 will be discussed further related to FIG. 10.

The center channel identification step 140 is next and comprises identifying any remaining unpaired channel among the Y channels not being identified as the LFE channel or divided into pairs as a center channel.

The center channel identification step 140 may further comprise calculating the independence and/or uncorrelation of any remaining unpaired channel among the Y channels not being identified as the LFE channel or divided into pairs compared to other channels among the Y channels and identifying the center channel as the most independent and/or uncorrelated channel.

This may e.g. be calculated based on measuring the content of the different channels in e.g. the temporal, spectral, wavelet and/or auditory domain.

The calculation of independence and/or uncorrelation of any remaining unpaired channel among the Y channels not being identified as the LFE channel or divided into pairs may only be calculated compared to channels divided into pairs. This is because the center channel typically is the most independent and/or uncorrelated to the pair channels.

In another embodiment, the center channel identification step 140 occurs after the channel pair differentiation step 150 and the calculation of independence and/or uncorrelation is only calculated compared to channels differentiated as the front pair.

This is because the center channel is typically the least independent and/or uncorrelated to the front pair channels, however still independent and/or uncorrelated. As such, if independence and/or uncorrelation is found, the identification of the center channel is highly reliable, as the possibility for false positives is reduced. Comparing the center channel to all pairs would be more reliable, however more resource intensive.

Either of these embodiments are beneficial in that they are highly reliable; however, they may require substantial computation. Hence, in a beneficial embodiment whatever remaining channel is identified as the center channel without verification.

If more than one channel remains, all may be identified as the center channel, or an error may be assumed which restarts the channel identification method. All steps may be re-done or only steps that are determined to be likely to be erroneous.

The repeated steps may e.g. always be the empty channel identification step 110 and/or the LFE channel determination step 120 if there is an even number of channels left because these may result in a different parity, and the channel pair dividing step 130 and/or the channel pair differentiation step 150 if there is an odd number of channels left different to one because these will result in the same parity.

Figure 6:
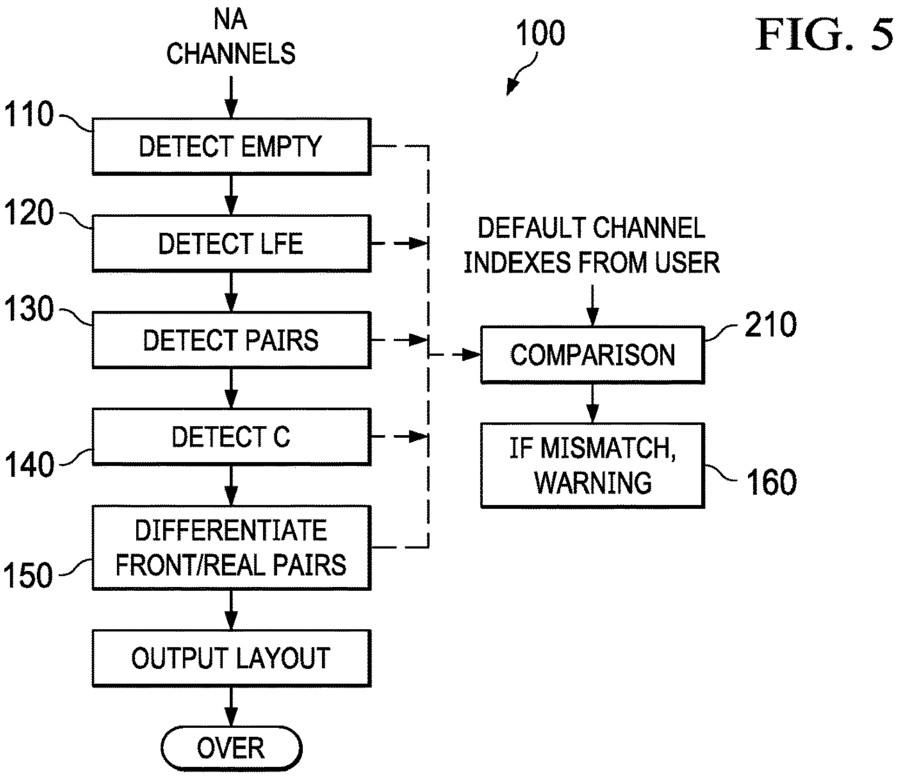
FIG. 6 shows a diagram of the steps of a method for channel identification according to some embodiments.

The repeated steps may additionally or alternatively be related to a confidence score of the steps, further explained related to FIG. 6.

The identification of the center channel may be stored using metadata.

Figure 5:
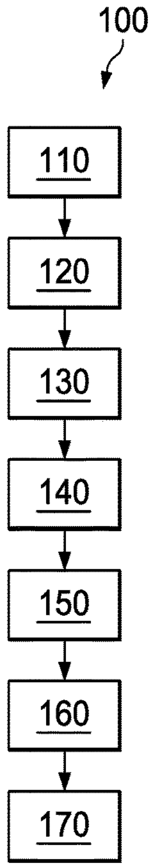
FIG. 5 shows a diagram of the steps of a method for channel identification according to some embodiments.

FIG. 5 shows a diagram of the steps of a method for channel identification. This embodiment further comprises a display step 160 and an applying step 170, which are discussed further in relation to FIGS. 8-9, respectively. The sequence shown in FIG. 5 is a preferred order due to efficiencies achieved by reusing previous results, however any sequence is possible.

FIG. 6 shows a diagram of the steps of a method for channel identification. As each channel is detected, e.g. after each step of the method, they are compared 210 to the settings of the system, e.g. the channel indexes selected by the user. If any mismatch is detected, a warning 160 may be issued.

In one embodiment, the mismatch is automatically fixed. In another embodiment, the mismatch is not fixed unless a user confirms it, e.g. after receiving the warning.

In some embodiments, the method further comprises calculating a confidence score for any of the results of the steps of the method, the confidence score being a measurement of how reliable the result is.

This may be displayed to the user as part of the warning, to allow the user to make an informed decision about whether the method's identification is more reliable than the current settings.

If the time duration of the multi-channel audio signal is below a certain time duration threshold, the confidence score may be multiplied by a weight factor less than one, so that a time duration less than the time duration threshold leads to a less reliable result.

The weight factor may be proportional to the time duration divided by the time duration threshold, so that a relatively longer time duration leads to a more reliable result. This increases the accuracy of the weight factor.

In one embodiment, the weight factor is not applied or is equal to one if the time duration is longer than the time duration threshold. This increases the accuracy of the weight factor.

The weight may be calculated according to the following equation:

$$W = \begin{cases} \left(\frac{L}{L_{thd}}\right)^2, & L \le L_{thd} \\ 1, & \text{otherwise} \end{cases}, \quad \text{(equation 2)}$$

where L is the length of data, based on which the channel identification is conducted, and $L_{thd}$ is the time duration threshold. It means that if the data is lower than the time duration threshold, the identification is unreliable.

In most embodiments, a relatively more reliable result has a relatively higher confidence score.

The time duration threshold may e.g. be a constant between 1-60 minutes, 5-30 minutes, 10-20 minutes, or 15 minutes. The time duration threshold may instead be a relative length, such as a fiftieth, twentieth, tenth, fifth, third or half of the length of data.

The confidence score for the empty channel identification step 110 may be proportional to the sound energy of the identified empty channels, so that a relatively lower sound energy leads to a more reliable result.

In embodiments where a channel with sound energy below an energy threshold may be identified as an empty channel, the reliability of this identification will depend on how far the sound energy is below the energy threshold. Hence, that a relatively lower sound energy leads to a more reliable result.

As the amount of empty channels are unknown, a confidence score lower than a confidence threshold may cause the result of the empty channel identification step 110 to be marked as unreliable, e.g. in a short-term memory or as metadata. This may cause warnings to be displayed to a user and/or the empty channel identification step 110 to be re-done, e.g. directly, if a mismatch is detected, or if the wrong amount of LFE and/or center channels are identified.

The confidence score for the LFE channel determination step 120 may be proportional to the difference between the sub-band sound energy in the low frequency region and the sub-band sound energy in all the other frequency regions of the determined LFE channel, so that a relatively larger difference leads to a more reliable result.

The LFE channel should comprise a substantially larger portion of sub-band sound energy in the low frequency region compared to all the other frequency regions, hence a large difference will be more reliable.

The difference between the sub-band sound energies may be calculated by comparing the sum of the sub-band sound energies in the different frequency regions.

The sum(s) may further be normalized to the size of each frequency region, respectively.

Alternatively, the difference between the sub-band sound energies may be calculated by comparing the average or normalized average of the sub-band sound energies in the different frequency regions.

A normalized average would preferably be normalized to the size of each frequency region.

The sum is preferred as this results in a larger difference, resulting in a more standardized confidence score.

The low frequency region may e.g. be any sub-band below 400 Hz, 300 Hz, 200 Hz, 120 Hz, 100 Hz, or 50 Hz. The low frequency region may be determined based on the content of the audio signal.

In further embodiments, the confidence score for the LFE channel determination step 120 is proportional to the sum of the sub-band sound energy of the determined LFE channel in frequency regions higher than a frequency threshold, so that a relatively lower sum leads to a more reliable result.

In this embodiment, the content in the low frequency region is not used when determining the confidence score. This may be beneficial depending on the embodiment.

In one embodiment, the confidence score for the LFE channel determination step 120 is proportional to: the difference between the sub-band sound energy in the low frequency region and the sub-band sound energy in all the other frequency regions of the determined LFE channel, so that a relatively larger difference leads to a more reliable result; and the sum of the sub-band sound energy of the determined LFE channel in frequency regions higher than a frequency threshold, so that a relatively lower sum leads to a more reliable result.

In this embodiment, both of the measurements deemed to be most useful are used in conjunction, possibly weighted differently, in order to produce a highly reliable confidence score.

The frequency threshold may e.g. be 2000 Hz, 1000 Hz, 500 Hz, 400 Hz, 300 Hz, 200 Hz, 120 Hz, 100 Hz, or 50 Hz or may be determined based on the content of the audio signal.

In some embodiments, the confidence score for the LFE channel determination step 120 is proportional to the highest frequency signal present in the determined LFE channel, so that a relatively lower highest frequency signal leads to a more reliable result.

Whether an LFE channel is present may be determined based on an energy threshold. The energy threshold may be adapted to disregard noise or may be so low that it is essentially non-existent, so that any signal present will affect the confidence score.

In these embodiments, only the cut-off of the maximum frequency is used when determining the confidence score. This may be beneficial depending on the embodiment.

As the prescence of an LFE channel is unknown, a confidence score lower than a confidence threshold may cause the result of the LFE channel determination step 120 to be marked as unreliable, e.g. in a short-term memory or as metadata. This may cause warnings to be displayed to a user and/or the LFE channel determination step 120 to be re-done, e.g. directly, if a mismatch is detected, or if the wrong amount (e.g. more than one) of center and/or LFE channels is identified, potentially even in a later step.

The confidence score for the center channel identification step 140 may be proportional to the independence and/or uncorrelation of the identified center channel compared to the channels among the Y channels not being identified as the LFE channel, so that a relatively high independence and/or uncorrelation leads to a more reliable result.

The center channel should be independent and/or uncorrelated to compared to the channels among the Y channels not being identified as the LFE channel, hence a high independence and/or uncorrelation will be more reliable.

If multiple calculation options for the confidence score for a certain step of the method are available, they may be applied in a hierarchy.

The confidence score may be stored using metadata.

Typically, a result with a confidence score below a confidence threshold (for any of the identification steps 110-150) may result in that the channel identification method 100 is restarted, e.g. using a greater length of data.

Figure 7A:
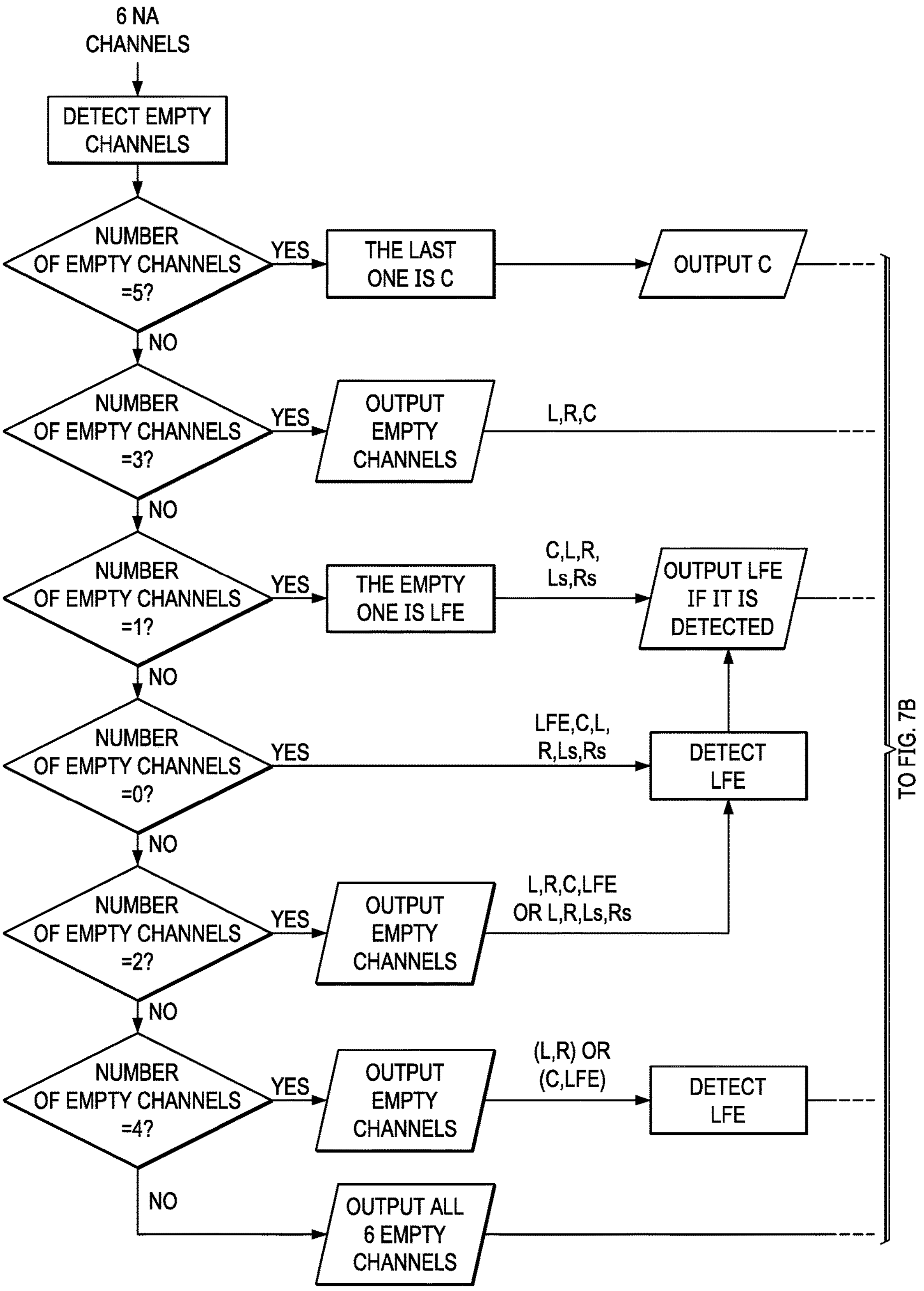
FIGS. 7A-7B show a flowchart of the steps of a method for channel identification according to some embodiments.
Figure 7B:
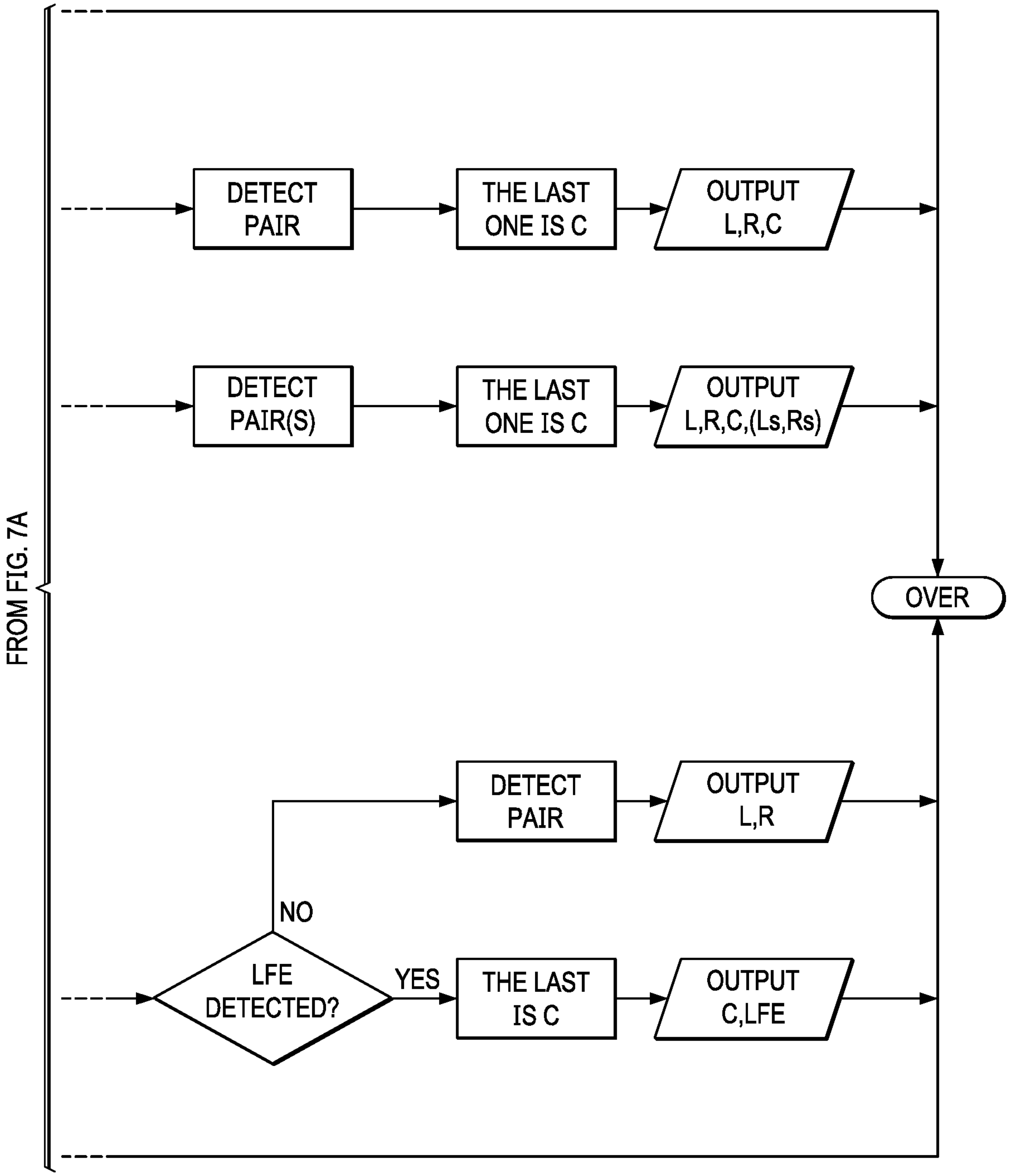

FIGS. 7A-7B show a flowchart of the steps of a method for channel identification. It shows a sequencing optimization of which checks and method steps are performed in what order in order to minimize computation. A 5.1 surround sound file format is assumed in this embodiment, however other formats are possible with minor changes.

The first step is the empty channel identification step 110. The result of this step allows the method to reduce the amount of possible configurations of the multi-channel audio signal to one or two options, listed after the result of the empty channel identification step 110.

The embodiment shown has six channels, however any other number is possible while adjusting the result of the number of empty channels.

If the empty channel identification step 110 results in the number of empty channels being five, the last one will automatically be identified as the center channel and then output.

If the empty channel identification step 110 results in the number of empty channels being three, the identified empty channels are output, and the remaining channels are assumed to be L, R, C. The channel pair dividing step 130 is used to find the pair and the remaining channel will automatically be identified as the center channel and then output with the pairs.

If the empty channel identification step 110 results in the number of empty channels being one, the empty channel is double-checked if it was mistaken for an LFE channel by using the LFE channel identification step 120. If an LFE channel is detected, it is output, otherwise the empty channel is output. The channel pair dividing step 130 is used to find the two pairs from among the five remaining channels and the remaining channel will automatically be identified as the center channel and then output with the pairs.

If the empty channel identification step 110 results in the number of empty channels being zero, an LFE channel must be present if the input is formatted according to 5.1 surround sound. In embodiments where e.g. 7.1 formatting is possible, the six remaining channels may e.g. be three pairs. The LFE channel is identified by using the LFE channel identification step 120 and output. The channel pair dividing step 130 is used to find the two pairs from among the five remaining channels and the remaining channel will automatically be identified as the center channel and then output with the pairs.

If the empty channel identification step 110 results in the number of empty channels being two, the identified empty channels are output, and the remaining channels may either be L, R, C, LFE or L, R, Ls, Rs. As the LFE channel identification step 120 is relatively efficient, it is used next. If an LFE channel is detected, it is output, and the remaining channels are L, R, C. Otherwise, the remaining channels are L, R, Ls, Rs. The channel pair dividing step 130 is used to find the one or two pairs from among the three or four remaining channels and any remaining channel will automatically be identified as the center channel. Either way, the identified channels are then output.

If the empty channel identification step 110 results in the number of empty channels being four, the identified empty channels are output, and the remaining channels may either be L, R or C, LFE. As the LFE channel identification step 120 is relatively efficient, it is used next. If an LFE channel is detected, the remaining channel is automatically be identified as the center channel and then output with the LFE channel. If an LFE channel is not detected, the remaining channels are an L, R pair. The pair may be directly output or the channel pair dividing step 130 may be used as a precaution before the divided pair is output.

If the empty channel identification step 110 results in the number of empty channels being six, all channels are empty. In that case, the empty channels are output, and the method is finished.

The embodiment shown does not comprise a channel pair differentiation step 150. If it did, it would occur before the "Output L, R, C, (Ls, Rs)" result.

The embodiment shown does not comprise a center channel identification step 140 beyond identifying any single remaining channel as the center channel, however it would be simple for a skilled person to amend it according to previously discussed embodiments. It further assumes that any single remaining channel is C and not LFE as this is more common, however it may perform the LFE channel determination step 120 and/or the center channel identification step 140 in other embodiments where this is not assumed.

Figure 8:
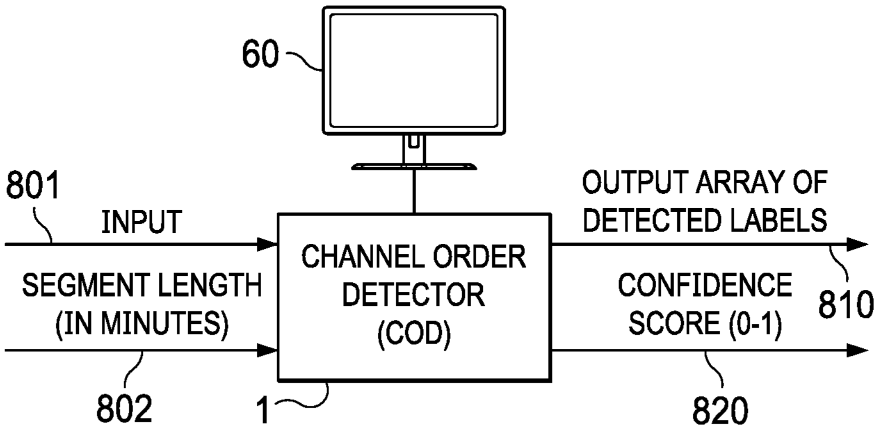
FIG. 8 shows a system architecture for a channel order detector according to some embodiments.

FIG. 8 shows a system architecture for a channel order detector 1. The channel order detector applies the method for channel identification according to the invention in order to detect the order of the channels.

The channel order detector 1 may be adapted to carry out a method according to a computer program product. The computer program product comprises a non-transitory computer-readable storage medium with instructions adapted to carry out a method according to the invention when executed by a device having processing capability, such as the channel order detector.

A multi-channel audio signal comprising X>1 channels is input 801 into the channel order detector. The segment length 802 of the audio signal may be analyzed from the audio signal or input separately. The segment length 802 corresponds to the total length (in mins) of the input data. Hence, if an audio file is input, the segment length 802 corresponds to the total length of the audio signal of that file.

The method for channel identification results in identified channels. The order detector may then use the identified channels to output an ordered array of the labels of the channels 810.

Any number of confidence scores 820 as previously discussed may also be output relating to the reliability of the results of the method. The confidence score may be normalized to 0-1, where a confidence score of 0 is unreliable and 1 is reliable or vice versa.

The outputted array of detected labels may be used by a playback system to correctly match the multiple channels to the multiple sound sources, so that e.g. the center channel comes out of the center speaker and so on.

A system comprising the channel order detector may further comprise a display. The method may comprise a display step 160 wherein the calculated confidence score(s) is/are displayed on the display 60.

The display 60 is beneficial in that a user may receive feedback regarding the reliability of the method.

The display step 160 may further comprise displaying a warning if the calculated confidence score is below a confidence threshold.

The warning is beneficial in that it may alert the user to take action in order to e.g. stop the method, redo the method or improve the method by e.g. increasing a bit streaming rate and/or fixing a glitch upstream.

The identified channel layout may be displayed in a display step 160 (see FIG. 5). This may provide more relevant feedback for the user.

In some embodiments, the display step 160 further comprises waiting for a user input using a user interface such as a button or a touch-screen. The display 60 may thus comprise interface(s) for receiving such user input.

This prevents the method from continuing without a user having the possibility to analyze the results and provide feedback.

The identified channel layout may be approved by the user before being applied to the multi-channel audio signal. This reduces the risk of any mistake being applied.

The user may not be prompted to approve an identified channel layout being identical to the setting layout of the user. As this scenario does not require any change to the playback system, this conserves time and reduces the requirements of the user.

The display step 160 may further comprise displaying a warning if the identified channel layout is different to the setting layout of the user. As this may warrant and/or force a change to the setting layout, the user may want to know before this happens.

The warning level may be proportional to the calculated confidence score(s). A confidence score indicating an unreliable result may e.g. warrant: a more easily noticeable warning such that the user may stop the method, redo the method, and/or improve the method; or a less easily noticeable warning such that the user disregards a likely false warning.

The display step 160 may further comprise allowing a user to manipulate the displayed data. The user may have information beyond what is available to the method and may add and/or change the data available to the method.

The manipulated data may be used in the channel identification steps of the method. This means that changes made as the method runs may be used to improve the channel identification steps as they occur. The manipulated data may additionally or alternatively be used for subsequent runs of the method.

The display step 160 may further comprise allowing a user to select at least one segment of the signal to ignore. This allows the user to e.g. identify a defect in the audio signal that disturbs the method and remove it.

Figure 9:
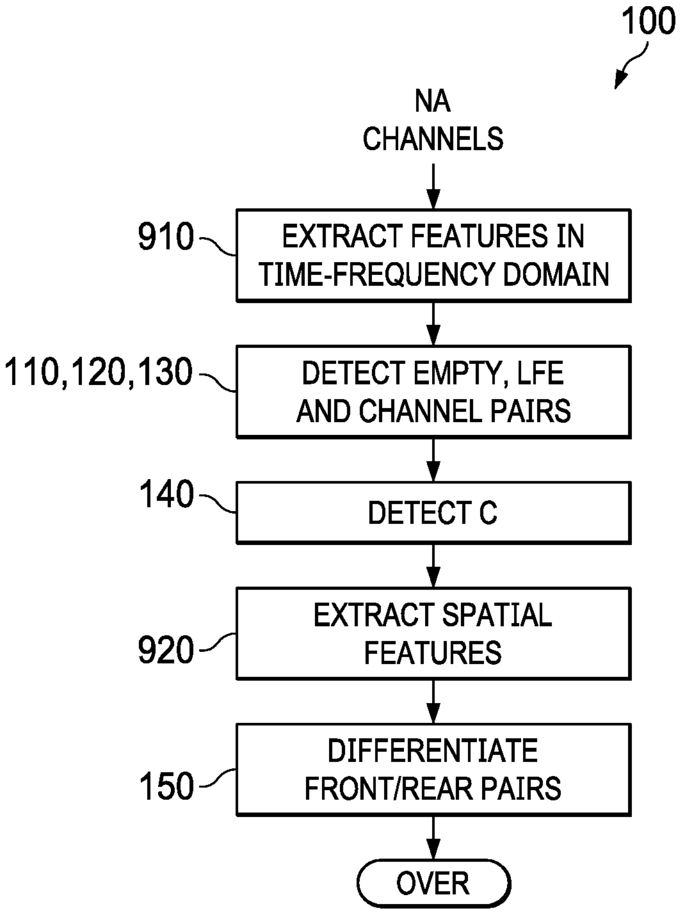
FIG. 9 shows a diagram of the steps of a method for channel identification according to some embodiments.

FIG. 9 shows a diagram of the steps of a method for channel identification. The embodiment shown shows different steps of the method being performed in different domains. In this embodiment, the empty channel identification step 110, the LFE determination step 120, the channel pair dividing step 130, and the center channel identification step 140 occurs in a time-frequency domain such as the wavelet domain; while the channel pair differentiation step 150 occurs in the spatial domain. This is achieved by e.g. transforming 910, 920 the multi-channel audio signal before the specific steps in order to extract features in a specific domain and reverse transforming after the steps are performed.

This is only one possible embodiment, in other embodiments different steps of the method than the ones shown are performed in different domains than the ones shown, or for example the entire method is performed in one domain.

The method 100 may further comprise a step of applying 170 the identified channel layout to the multi-channel audio signal. This may comprise: changing the order of the channels of the multi-channel audio signal; re-directing the channels to the identified playback source, i.e. so that the left channel is output by the left speaker; or any other physical and/or digital manipulation of the multi-channel audio signal to conform to the identified layout being a result of the method for channel identification.

In some embodiments, the identified channel layout is only applied if the calculated confidence score(s) exceed(s) a confidence threshold.

It may worsen the projected sound image to apply the identified channel layout if it is unreliable, hence a confidence threshold may be used to prevent this.

The applying step 170 may comprise using any present metadata to apply the identified channel layout to the multi-channel audio signal. The metadata may make the applying step 170 more effective and may be used by any further system in the broadcast chain.

The channel layout identified by the method may be applied in real time to the multi-channel audio signal as it is being streamed to a speaker system.

As the proposed method is very computationally efficient, it may be applied in real time without any significant delay to the playback.

The first results may be inaccurate, and the confidence scores low, and then they increase with more data acquired as the audio signal plays.

A real time embodiment of the method may comprise: initialization, to clear all the data buffer and get the channel number. After some new data is acquired, channel identification may be conducted on all the available data. The features of previous data may be used to keep the consuming complexity low. Non-consistent data may also be accepted. If no decision may be made for certain channels based on the available data, the channels may be labeled as unknown, and the confidence scores are 0. At the beginning, the confidence scores of all channels are low because of the global weight factor. After enough data is received, the identification keeps constant, and the confidence scores may fluctuate a little.

The multi-channel audio signal may be a multi-channel surround sound file or stream for content creation, analysis, transformation and playback systems. These systems are highly affected by the channel layout.

At least one of the steps of the method may use machine learning based methods. The machine learning based methods may be a decision tree, Adaboost, GMM, SVM, HMM, DNN, CNN and/or RNN.

Machine learning may be used to further improve the efficiency and/or the reliability of the method.

SVM for channel pair detection may be taken as an example. Represent the inter-channel spectral distance between channel i and j in frame l as $D_{i,j}(l)$, as is shown in equation 3. Then divide the whole frequency band into 1, 2, . . . or K different bands and the inter-channel spectral distances are calculated, resulting in mean inter-channel spectral distance $\overline{D_{i,j}}$ respectively. Then the K values of $\overline{D_{i,j}}$ may be grouped as a channel distance vector for channels i and j. For all the channels that are not detected as LFE or empty, the channel distance vectors between each possible pair of them are calculated. If channels i and j belong to one pair, then the label for this vector is 1, otherwise it is 0. A support vector machine may be trained based on a labelled training database, and then be used to detect the channel pairs.

Figure 10:
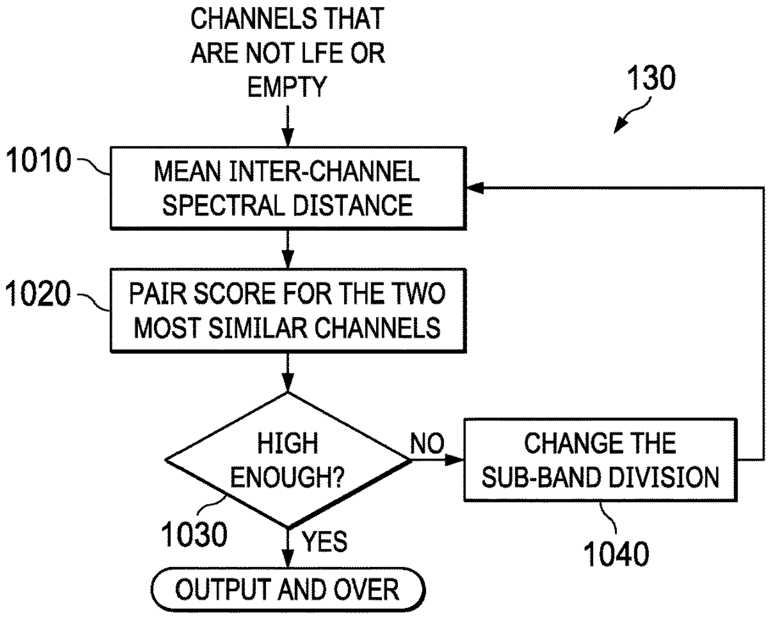
FIG. 10 shows a flowchart of a channel pair dividing step according to some embodiments.

FIG. 10 shows a flowchart of a channel pair dividing step 130. Channel pair detection is normally conducted on the channels that are not empty and not LFE in order to be more efficient. If the number of unknown channels is two or higher, channel pairs may be detected.

The matching of symmetrical channels in the channel pair dividing step 130 may further comprise comparing temporal features, spectral features, auditory features and/or features in other domains to calculate sound energy distribution and variance between the audio signal of each channel and matching the most symmetrical channels as a pair.

Symmetric channels are found as channels of audio with substantially similar and/or symmetric sound signal content by analyzing sound energy distribution and variance. Symmetric sound signal content may e.g. comprise similar background sound and different foreground sound, similar base sounds and different descant sounds, or vice versa respectively. Symmetric sound signal content may further comprise synchronized sound such as different parts of a single chord or a sound starting in one channel and ending in another.

If the features of two channels are quite close while they are quite different from those of the other channels, or if the correlation between two channels are higher than the others, the two channels may be divided into a channel pair.

The matching of symmetrical channels in the channel pair dividing step 130 may further comprise calculating 1010 inter-channel spectral distances between the channels using the calculated sound energy distribution and variance of each channel in short-term, medium-term and/or long-term time duration; the inter-channel spectral distance being a normalized pairwise measurement of the distance between two matching sound energy sub-bands in each channel, summed for a plurality of sub-bands; and matching the channels with shortest distance to each other as a pair.

The distance measure used may be Euclidean Distance, Manhattan distance and/or Minkowski distance.

All of the following examples are in the frequency domain, however other domains are possible. Besides the embodiments with time-frequency features, features derived from other ways of signal transformation or signal analysis theory may also be used to do e.g. pair detection and/or confidence score estimation. Besides the heuristic-rule-based method as above, machine learning based method like regression, decision tree, adaboost, GMM, HMM or DNN may also be used for e.g. pair detection and/or confidence score estimation.

In one embodiment, the distance between channel i and j in frame l is calculated according to:

$$D_{i,j}(l) = \frac{1}{B}\sum_{b=1}^{B} \frac{|E_{b,i}(l) - E_{b,j}(l)|}{\max(E_{b,1}(l), E_{b,2}(l) \ldots E_{b,C}(l))}, \quad \text{(equation 3)}$$

where i, j are in range of [1, C] and i≠j, C is the number of channels, B is the number of the frequency band, b=1 . . . B is the index of the frequency band, l=1 . . . L is the index of the frame, and $E_{b,i}(l)$ and $E_{b,j}(l)$ are the time-frequency energies in band b of channel i and j.

An average over time of the calculated inter-channel spectral distances may be calculated and used to match the channels with the shortest averaged distance to each other as a pair. This is used to measure the long-term similarity between channels.

In one embodiment, the mean inter-channel distance between channel i and j is calculated according to:

$$\overline{D_{i,J}} = \frac{1}{L}\sum_{l=1}^{L} D_{i,j}(l), \quad \text{(equation 4)}$$

where i, j are in the range of [1, C] and i≠j, l is in the range of [1, L], C is the number of channels, and L is the number of frames.

The lowest and/or highest inter-channel distance may be used instead or in addition to the average distance. However, the average is preferred because while the pair channels are similar on average, they are not necessarily always similar at e.g. each frame.

In embodiments with the inter-channel spectral distances, the center channel identification step 140 may further comprise analyzing the calculated inter-channel spectral distances of any remaining unpaired channel among the Y channels not being identified as the LFE channel or divided into pairs to identify the center channel. This will further increase the accuracy of the center channel identification step 140.

The confidence score for the center channel identification step 140 may be proportional to calculated inter-channel spectral distances between the identified center channel and the other channels among the Y channels not being identified as the LFE channel, so that relatively symmetrical distances lead to a more reliable result.

The center channel preferably has symmetrical distances to other channels not being identified as the LFE channel, i.e. paired channels, hence relatively symmetrical distances lead to a more reliable result.

The confidence score for the center channel identification step 140 may be directly proportional to the confidence score of the channel pair dividing step 130 if it is present.

If e.g. the center channel identification step 140 only comprises identifying any remaining channel, the reliability of the center channel identification step 140 is directly proportional to the reliability of the channel pair dividing step 130. Even in other embodiments, the reliability of the matching of the pairs may directly affect the reliability of the center channel identification step 140 as this may impact the available channels to be identified as the center channel.

The matching of symmetrical channels in the channel pair dividing step 130 may further comprise comparing the correlation of sound energy distribution of each channel and matching the most correlated channels as a pair. This is a simple and efficient calculation; however, it only works in some embodiments.

The correlation measure used may be cosine similarity, Pearson correlation coefficient and/or correlation matrixes.

The channel pair dividing step 130 may further comprise, for each of the channels among the Y channels not being identified as the LFE channel, measuring, and/or importing from a previous measurement if any, at least one parameter used for the calculations that match the channels as pairs.

The measurements may e.g. be sound energy measured in the empty channel identification step 110 or the LFE channel determination step 120. This improves the efficiency of the method 100.

If the channel pairs are matched differently according to the feature(s) used to match them, a hierarchy of the feature(s) may be used to determine which pairings to apply.

The hierarchy may e.g. be a type of measurement being preferred over another, such as mean inter-channel spectral distance being preferred over maximum inter-channel spectral distance or correlation of sound energy distribution.

The channel pair dividing step 130 may continue pairing up any unpaired channel among the Y channels not being identified as the LFE channel until fewer than two channels remain.

There may be more than two pairs of channels, such as a front pair and a back pair in 5.1 audio format. Hence, if more than two channels remain it is likely that more channel pairs are among them, and more pairs are possible to divide.

The channel pair dividing step 130 may further comprise assigning the first received channel of the multi-channel audio signal within each pair as the left channel and the last listed channel within each pair as the right channel.

It is customary to list the left channel in each pair before the right channel in a multi-channel audio signal, so by assuming this is always the case, the method 100 is more efficient.

The division into pairs of channels and/or the assignment of the left and right channel if any may be stored using metadata.

The confidence score for the channel pair dividing step 130 may be proportional to a symmetry measure of the matched pair(s), so that a relatively high symmetry measure leads to a more reliable result.

Correctly matched pairs preferably have a high symmetry, so if the result of the channel pair dividing step 130 has pairs with relatively high symmetry, it is relatively reliable.

The confidence score for the channel pair dividing step 130 may be proportional to a calculated inter-channel spectral distance between the matched pair(s), so that a relatively shorter distance leads to a more reliable result.

Correctly matched pairs preferably have a short distance between each other, so if the result of the channel pair dividing step 140 has pairs with relatively short distance, it is relatively reliable.

The confidence score for the channel pair dividing step 140 may be proportional to calculated inter-channel spectral distances between each channel in the matched pair(s) and the other channels among the Y channels not being identified as the LFE channel or being the matched channel, so that relatively long distances lead to a more reliable result.

Correctly matched pairs preferably have a long distance to other channels, so if the result of the channel pair dividing step 140 has pairs with relatively long distances to other channels, it is relatively reliable.

At least a part of the channel pair dividing step may be re-done 1040 with a different sub-band division when calculating inter-channel spectral distance if the confidence score for the step is below a confidence threshold 1030.

By changing the sub-band division, a more reliable result may be achieved. In some embodiments, the sub-band division is changed until a satisfactory reliability of the channel pair dividing step 140 is achieved, e.g. through a confidence threshold or a pair score threshold 1030.

A pair score is a measurement to compare the possibility that the members of the pair may be grouped into other pairs. The pair score threshold is a predetermined threshold for the pair score(s). If the pair score(s) is/are higher than the pair score threshold, the result of the channel pair dividing step 140 is sufficiently reliable.

A version of this is shown in the flowchart of FIG. 10. First, a mean inter-channel spectral distance is calculated for every possible pair. Then the pair score is calculated 1020 for the pair with the lowest inter-channel spectral distance. If the pair score is not high enough for decision making, different time-frequency segmentation may be used to get a new mean inter-channel spectral distance and the corresponding pair score. The trial may be conducted until all the channels are paired or some terminating condition is met. If more than two channels are still undetected, the confidence score of them are all set as 0.

The confidence score may further be weighted by the global weight factor to account for the total length of the data. The channel pair detection is conducted on all the unknown channels until only one channel is left.

The pair score may be used as the confidence score or as a part of the confidence score.

In one embodiment, the pair score for a pair of channels i and j is calculated according to:

$$P_{i,j} = \frac{1}{L}\min (M_{1,i}, M_{2,i}, \ldots , M_{q,i}, \ldots M_{C,i}, M_{1,j}, M_{2,j}, \ldots , M_{q,j}, \ldots M_{C,j}), \quad \text{(equation 5)}$$

where $M_{q,i}(l)$ is the number of frames in which $D_{q,i}(l) < D_{i,j}(l)$, where q is the channel index, q≠i, q≠j. The range of $M_{q,i}(l)$ is [0,L].

The pair score may be calculated for any possible pair or only for the two channels with the lowest mean inter-channel spectral distance, i.e. being channels i and j in the above equation. The pair score is a measure of the confidence of dividing them as a channel pair.

The pair score compares the inter-channel spectral channel distance between the candidate channel pair i, j to each of the other channels, and makes sure that the two channels are alike each other while different from any of the other channels. If there exist other channels that are also similar to channel i or j, $P_{i,j}$, will be much lower than 1 and therefore signify a low reliability.

Figure 11:
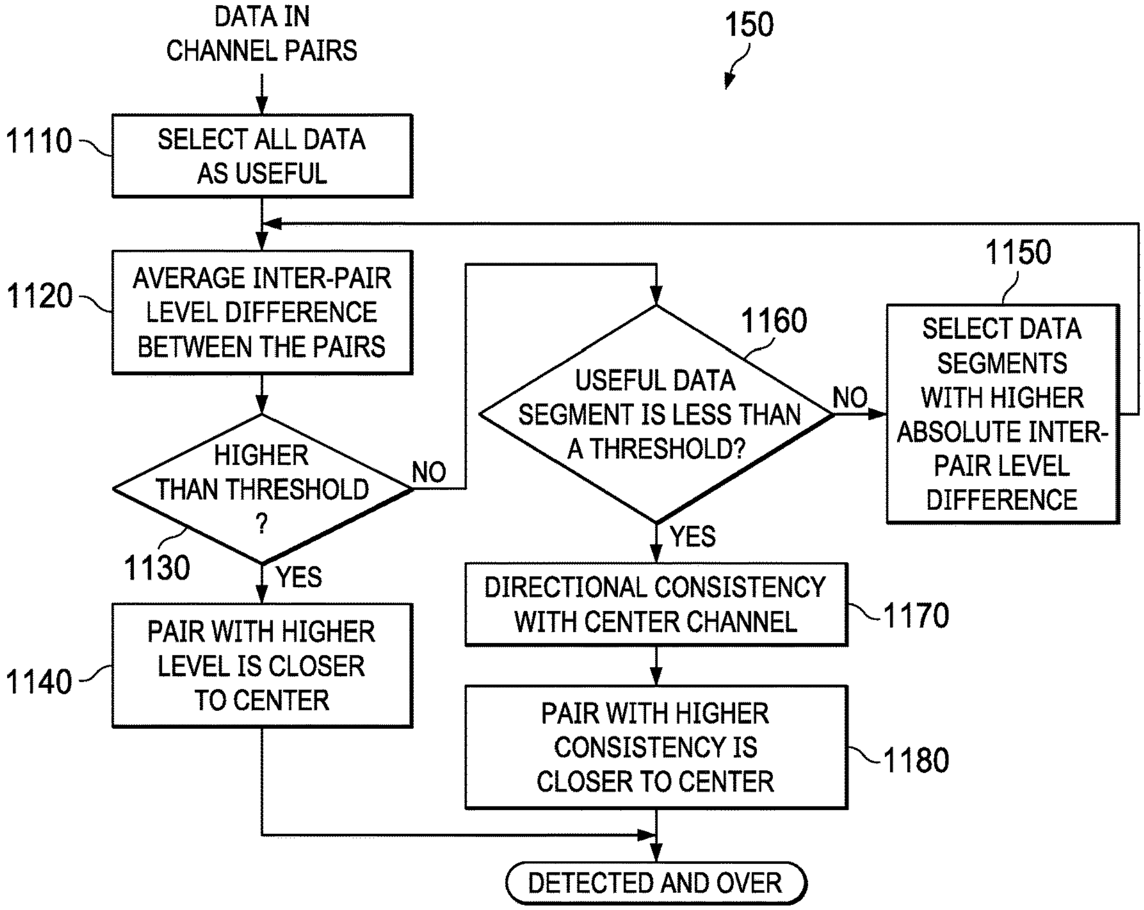
FIG. 11 shows a flowchart of a channel pair position differentiation step according to some embodiments.

FIG. 11 shows a flowchart of a channel pair positional differentiation step 150. The channel pair differentiation step 150 comprises differentiating the channels divided into pairs between a front pair, side pair, back pair and/or any other positional pair.

The channel pair differentiation step 150 is a part of the method for channel identification, preferably performed after the pair dividing step 130.

Many multi-channel audio signals comprise more than one channel pair; such as 5.1, which comprises a front pair and a back pair. It is therefore beneficial for the method for channel identification to be able to differentiate between positional pairs and correctly identify them as such.

The directional stability of the frontal sound image is usually maintained in most part of time duration and the rear channels usually carry information that can enhance the whole sound image.

The channel pair differentiation step 150 may comprise calculating 1120 an inter-pair level difference of each pair; the inter-pair level difference being proportional to a decibel difference of a sum of the sub-band sound energies of each pair; wherein the pair with the relatively highest level is differentiated as the front pair.

Alternatively or additionally, amplitude panning may occur in conjunction with the calculation of the inter-pair level difference. Amplitude panning comprises generating a virtual sound source.

Most of the virtual sound sources may be generated to appear from the frontside. This will result in the front pair having a relatively higher amplitude than the other positional pairs, hence the pair with the highest amplitude may be differentiated as the front pair.

Panning methods may further comprise making the back pair out of phase. Thus the relatively out of phase pair may be differentiated as the back pair.

The front pair is traditionally the pair with the relatively highest level 1140 as the highest level should be closest to the center channel.

In one embodiment, the inter-pair level difference between a pair of channels i and j and another pair of channels m and n, both of band b, is calculated for each time-frequency tile according to:

$$ILD_{(i,j),(m,n)} = 10\log_{10}\left(\frac{E_{b,i}(l)+E_{b,j}(l)}{E_{b,m}(l)+E_{b,n}(l)}\right), \quad \text{(equation 6)}$$

where $E_{b,i}(l)+E_{b,j}(l)$ and $E_{b,m}(l)+E_{b,n}(l)$ are sub-band energies of pair (i,j) and pair (m,n), on band b in frame l, respectively, $E_{b,i}(l)$, $E_{b,j}(l)$, $E_{b,m}(l)$ and $E_{b,n}(l)$ are the sub-band energies of band b of channel i, j, m, n in frame l, respectively, where i, j, m, n are unequal integers in in range of [1, C] where C is the number of channels; b=1 . . . B where B is the number of frequency band, and 1=1 . . . L where L is the number of frames.

The inter-pair level difference between the pairs is not always high enough, as a difference below 2 dB may not be informative. Hence segments of the signal with content that may produce a larger inter-pair level difference between the pairs may be selected.

Accordingly, the channel pair differentiation step 150 may further comprise selecting one or more segments of the signal for each channel in each pair where the sub-band sound energies of the signal is above an energy threshold; and calculating the inter-pair level difference of the channels using only these segments.

By selecting segments with a large quantity of information in the form of sub-band sound energies above an energy threshold, the inter-pair level difference may increase.

The channel pair differentiation step 150 may further comprise selecting 1150 one or more segments of the signal for each pair where an absolute inter-pair level difference is above an absolute threshold; and calculating the inter-pair level difference of the channels using only these segments.

By selecting segments with a high threshold, the average inter-pair level difference may increase. Many multi-channel audio signals have similar output in more than one channel during parts of the signal. These parts will not contribute to the inter-pair level difference and may therefore safely be ignored.

As a complement to measuring the absolute inter-pair level difference, an average inter-pair level difference in a relatively small segment compared to the total length of the signal may also or instead be used.

If the selection of segments does not result in a high enough average inter-pair level difference, a selection with a higher absolute threshold may achieve it.

As such, if the relatively highest average inter-pair level difference is below a level threshold (determined in step 1130), the step of calculating the inter-pair level difference of the channels may be repeated with a higher absolute threshold 1150 until the average inter-pair level difference is high enough.

Alternatively or additionally, if the relatively highest average inter-pair level difference is below a level threshold, the pair with the relatively highest combined directional consistency with the identified center channel may be differentiated as the front pair.

In one embodiment, the selection of segments is abandoned and directional consistency with the identified center channel is instead used to differentiate the pairs. The pair with direction closest to the center channel is also closest to the center channel.

Directional consistency is a measurement of the similarity of two channels in the time domain, which relates to the sound image direction, which in turn implies the phase difference between the channels.

Directional difference may be used to measure the consistency of directions of main sound sources between two channels. A simplified measure of direction consistency according to an embodiment follows:

$$X = \frac{1}{T}\sum_{n=1}^{T}\frac{|S_i(n)+S_j(n)|}{|S_i(n)|+|S_j(n)|}, \quad \text{(equation 7)}$$

where $S_i(n)$ is the nth sample value of channel i in the time domain, such that each value of $S_i(n)$ corresponds to one point on the waveform, and the total sample value is T. It implies the phase difference between two channels.

The front pair should traditionally have a relatively higher directional consistency with each other than the other positional pairs and the back pair should traditionally have a relatively lower directional consistency with each other than the other positional pairs.

The signals in front pair are usually time-aligned to represent directional sound sources, so they have higher correlation and lower delay. This means that there are more identical components in the front pair compared to the back pair. The directional difference, as exemplified in equation 7, is to measure this. If the signals in channels i and j are identical, this means they are in phase and then X=1, otherwise X<1. If the two channels are out of phase, X=0

In another embodiment, if the relatively highest average inter-pair level difference is below a level threshold and the absolute threshold is higher than a maximum threshold 1160, the pair with the relatively highest combined directional consistency with the identified center channel 1170 is differentiated as the front pair 1180.

This embodiment is shown in FIG. 11. In this embodiment, all of the signal was selected 1110 at first, however the average inter-pair level difference has not reached a high enough level to go beyond the level threshold and the selection of segments has failed to produce a high enough average inter-pair level difference. As such, directional consistency with the identified center channel is instead used to differentiate the pairs.

The selection of segments has failed, because the average inter-pair level difference has not reached a high enough level to go beyond the level threshold and the absolute threshold is so high that the segments above it are not long enough to be able to calculate an inter-pair level difference.

The level threshold may be a constant between 2-3 dB. The maximum threshold of the absolute threshold may be 2 dB and/or any threshold that results in a total length of the selected segments being shorter than e.g. 20% of the non-silence signal length or shorter than e.g. 1 minute.

The maximum threshold of the absolute threshold relates to when the selected one or more segments of the signal for each channel in each pair where the average inter-channel spectral distance is above the distance threshold are no longer long enough to calculate the inter-channel level difference. If the total length of the selected segments is shorter than 20% of the non-silence signal length or shorter than 1 minute, the useful signal is too short.

The differentiation between positional pairs may be based on their similarity to the identified center channel. In that case, the pair most similar to the identified center channel may be differentiated as the front pair and the pair least similar to the identified center channel may be differentiated as the back pair.

It is customary that the center channel is the front of the sound image, hence the front pair should e.g. be more like it than the back pair.

The similarity to the identified center channel may be based on time-frequency features, spatial features, sound-image direction, phase difference between the channels and/or inter-channel pair level difference.

Additionally or alternatively, the similarity to the identified center channel may be calculated using delay panning, wherein the pair with the highest directional consistency with the center channel is differentiated as the front pair.

Time-frequency features are first checked, then the spatial features, because amplitude panning is most frequently used and the calculation of the time-frequency feature is not very time-consuming.

A directional pattern of the channels may be generated to compare the center-to-pair distances of the channel pairs. The channel pair that is closer to center channel is then detected as the front pair.

If different pairs are differentiated as the same positional pair depending on features used to make the differentiation, the features may be prioritized according to a hierarchy.

The hierarchy may depend e.g. on the confidence score, the measurement used, or the thresholds used.

The differentiation of the pairs of channels may be stored using metadata.

A confidence score may be calculated for the result of the channel pair differentiation step 150.

The confidence score for the channel pair differentiation step 150 may be proportional to calculated inter-channel spectral distances between the identified center channel and the paired channels among the Y channels not being identified as the LFE channel, so that a relatively small inter-channel spectral distance between the front pair and the center channel leads to a more reliable result.

The pair closest to the identified center channel should be differentiated as the front pair and the pair least similar to the identified center channel should be differentiated as the back pair, and this measurement reflects this.

The confidence score for the channel pair differentiation step 150 may be proportional to the directionality of the channels of the divided pairs, so that a relatively large difference between the directionality leads to a more reliable result.

The pair with direction closer to the center channel is also closer to the center channel, hence being the front pair. Thus, a large difference leads to a more reliable differentiation. The absolute difference and/or a ratio of the different pairs may be used.

For a similar reason, the confidence score for the channel pair differentiation step 150 may be proportional to the directionality of the identified center channel and the channels of the divided pairs, so that a relatively small difference between the directionality of the center channel and one of the pairs leads to a more reliable result.

The confidence score for the channel pair differentiation step 150 may be proportional to the calculated inter-pair level difference of the paired channels, so that a relatively high average level difference leads to a more reliable result.

An average inter-pair level difference above 2 dB is informative and the higher it is, the more informative it is. More information leads to a more reliable result.

The confidence score for the channel pair differentiation step 150 may be directly proportional to the confidence scores of the channel pair dividing step 130 and/or the center channel identification step 140, if they are present.

The channel pair differentiation step 150 will be unreliable if the channel pair dividing step 130 is unreliable. Further, many possible confidence score calculations for the channel pair differentiation step 150 depend on the center channel identification step 140. Hence, to conserve computation, a previously calculated confidence score for the channel pair dividing step 130 and/or the center channel identification step 140 may be re-used.

The confidence score for the channel pair differentiation step 150 may be proportional to the length of the selected one or more segments of the signal, so that a relatively long one or more segments leads to a more reliable result.

A short length of selected segments will make the calculation of the inter-pair level difference unreliable. The absolute length of the selected segments and/or a ratio of the length of the selected segments compared to the total length of the data may be used.

At least a part of the channel pair differentiation step 150 may be re-done with a different data segment if the confidence score for the step is below a confidence threshold.

This guarantees that the result of the channel pair differentiation step 150 is reliable.

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. For example, aspects of the present application may be embodied, at least in part, in an apparatus, a system that includes more than one device, a method, a computer program product, etc. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by a computer. Further, it is well known to the skilled person that communication media typically embodies computer readable instructions, data structures, program modules or other data in a modulated data signal such as a carrier wave or other transport mechanism and includes any information delivery media.

Various aspects of the present invention may be appreciated from the following enumerated example embodiments (EEEs):

EEE 1. A method for channel identification of a multi-channel audio signal comprising X>1 channels, the method (100) comprising the steps of:

- identifying (110), among the X channels, any empty channels, thus resulting in a subset of Y X non-empty channels;
- determining (120) whether a low frequency effect (LFE) channel is present among the Y channels, and upon determining that an LFE channel is present, identifying the determined channel among the Y channels as the LFE channel;
- dividing (130) the remaining channels among the Y channels not being identified as the LFE channel into any number or pairs of channels by matching symmetrical channels; and identifying (140) any remaining unpaired channel among the Y channels not being identified as the LFE channel or divided into pairs as a center channel.

EEE 2. The method according to EEE 1, further comprising a step of differentiating (150) the channels divided into pairs between a front pair, side pair, back pair and/or any other positional pair.

EEE 3. The method according to EEE 2, wherein the channel pair differentiation step comprises calculating an inter-pair level difference between the pairs; the inter-pair level difference being proportional to a decibel difference of a sum of the sub-band sound energies of each pair; wherein the pair with the relatively highest level is differentiated as the front pair.

EEE 4. The method according to EEE 3, wherein the channel pair differentiation step further comprises amplitude panning in conjunction with the calculation of the inter-pair level difference, amplitude panning comprising generating a virtual sound source.

EEE 5. The method according to EEE 3 or 4, wherein the channel pair differentiation step further comprises selecting one or more segments of the signal for each pair where the sub-band sound energies of the signal is above an energy threshold; and calculating the inter-pair level difference of the pairs using only these segments.

EEE 6. The method according to any one of the EEEs 3 to 5, wherein the channel pair differentiation step further comprises selecting one or more segments of the signal in each pair where an absolute inter-pair level difference is above an absolute threshold; and calculating the inter-pair level difference using only these segments.

EEE 7. The method according to EEE 6, wherein if the relatively highest average inter-pair level difference is below a level threshold, the step of calculating the inter-pair level difference of the channels is repeated with a higher absolute threshold.

EEE 8. The method according to any one of the EEEs 3 to 7, wherein if the relatively highest average inter-pair level difference is below a level threshold, the pair with the relatively highest combined directional consistency with the identified center channel is differentiated as the front pair.

EEE 9. The method according to EEE 7, wherein if the relatively highest average inter-pair level difference is below a level threshold and the absolute threshold is higher than a maximum threshold, the pair with the relatively highest combined directional consistency with the identified center channel is differentiated as the front pair.

EEE 10. The method according to EEE 9, wherein the maximum threshold of the absolute threshold is 2 dB.

EEE 11. The method according to any one of the EEEs 8 to 10, wherein the directional consistency is a measurement of the similarity of two channels in the time domain, which relates to the sound image direction, which in turn implies the phase difference between the channels.

EEE 12. The method according to any one of the EEEs 7 to 11, wherein the level threshold is a constant between 2-3 dB.

EEE 13. The method according to any one of the EEEs 2 to 12, wherein the differentiation between positional pairs is based on their similarity to the identified center channel.

EEE 14. The method according to EEE 13, wherein the pair most similar to the identified center channel is differentiated as the front pair and the pair least similar to the identified center channel is differentiated as the back pair.

EEE 15. The method according to EEE 13 or 14, wherein the similarity to the identified center channel is based on time-frequency features, spatial features, sound-image direction, phase difference between the channels and/or inter-pair level difference.

EEE 16. The method according to any one of the EEEs 13 to 15, wherein the similarity to the identified center channel is calculated using delay panning, wherein the pair with the highest directional consistency with the center channel is differentiated as the front pair.

EEE 17. The method according to any one of the EEEs 13 to 16, wherein the similarity to the identified center channel is calculated by generating a directional pattern of the channels to compare the center-to-pair distances of the channel pairs, wherein pair that is closer to center channel is differentiated as the front pair.

EEE 18. The method according to any one of the EEEs 2 to 17, wherein if different pairs are differentiated as the same positional pair depending on features used to make the differentiation, the features are prioritized according to a hierarchy.

EEE 19. The method according to any one of the EEEs 2 to 18, wherein the differentiation of the pairs of channels is stored using metadata.

EEE 20. The method according to any one of the previous EEEs, wherein the empty channel identification step further comprises measuring sound energy in each channel among the X channels.

EEE 21. The method according to EEE 20, wherein the sound energy in each channel among the X channels is measured in short-term, medium-term and/or long-term time duration.

EEE 22. The method according to EEE 20 or 21, wherein a channel is identified as empty if its total sound energy is below an energy threshold.

EEE 23. The method according to any one of the EEEs 20 to 22, wherein a channel is identified as empty if each of its sub-band sound energies are below an energy threshold.

EEE 24. The method according to any one of the EEEs 20 to 23, wherein the sound energy is measured in a temporal, spectral, wavelet and/or auditory domain.

EEE 25. The method according to any one of the previous EEEs, wherein the identification of an empty channel is stored using metadata.

EEE 26. The method according to any one of the EEEs 20 to 25, wherein the LFE channel determination step further comprises using the measured sound energy in each channel among the Y channels to determine whether an LFE channel is present.

EEE 27. The method according to any one of the previous EEEs, wherein the LFE channel determination step further comprises measuring the frequency bands where sound energy above an energy threshold is present in each channel among the Y channels.

EEE 28. The method according to EEE 27, wherein the frequency bands where sound energy above an energy threshold is present in each channel among the Y channels are measured in short-term, medium-term and/or long-term time duration.

EEE 29. The method according to any one of the EEEs 26 to 28, wherein it is determined that an LFE channel is present among the Y channels if the sum of sub-band sound energy in the low frequency region of a channel is significantly higher than the sum of sub-band sound energy in all the other frequency regions in that channel.

EEE 30. The method according to EEE 29, wherein the sum of sub-band sound energy in each frequency region is further normalized by the size of each frequency region, respectively.

EEE 31. The method according to EEE 29 or 30, wherein any such channel is identified as the LFE channel.

EEE 32. The method according to any one of the EEEs 29 to 31, wherein the low frequency region comprise any sub-band below 200 Hz.

EEE 33. The method according to any one of the EEEs 26 to 32, wherein it is determined that an LFE channel is present among the Y channels if a channel only comprises sub-band sound energy above an energy threshold in frequency regions below a frequency threshold.

EEE 34. The method according to EEE 33, wherein only any such channel is identified as the LFE channel.

EEE 35. The method according to EEE 33 or 34, wherein the frequency threshold is 200 Hz or higher.

EEE 36. The method according to any one of the EEEs 26 to 35, wherein if several LFE channels are determined to be present among the Y channels, only one is identified as the LFE channel according to a hierarchy of the feature(s) used to determine if an LFE channel is present.

EEE 37. The method according to any one of the previous EEEs, wherein the identification of the LFE channel is stored using metadata.

EEE 38. The method according to any one of the previous EEEs, wherein the matching of symmetrical channels in the channel pair dividing step further comprises comparing temporal features, spectral features, auditory features and/or features in other domains to calculate sound energy distribution and variance between the audio signal of each channel and matching the most symmetrical channels as a pair.

EEE 39. The method according to EEE 38, wherein the matching of symmetrical channels in the channel pair dividing step further comprises calculating inter-channel spectral distances between the channels using the calculated sound energy distribution and variance of each channel in short-term, medium-term and/or long-term time duration; the inter-channel spectral distance being a normalized pairwise measurement of the distance between two matching sound energy sub-bands in each channel, summed for a plurality of sub-bands; and matching the channels with shortest distance to each other as a pair.

EEE 40. The method according to EEE 39, wherein the distance measure used is Euclidean Distance, Manhattan distance and/or Minkowski distance.

EEE 41. The method according to EEE 38 or 40, wherein an average over time of the calculated inter-channel spectral distances is calculated and used to match the channels with shortest averaged distance to each other as a pair.

EEE 42. The method according to any one of the EEEs 39 to 41, wherein the center channel identification step further comprises analyzing the calculated inter-channel spectral distances of any remaining unpaired channel among the Y channels not being identified as the LFE channel or divided into pairs to identify the center channel.

EEE 43. The method according to any one of the previous EEEs, wherein the matching of symmetrical channels in the channel pair dividing step further comprises comparing the correlation of sound energy distribution of each channel and matching the most correlated channels as a pair.

EEE 44. The method according to EEE 43, wherein the correlation measure used is cosine similarity, Pearson correlation coefficient and/or correlation matrixes.

EEE 45. The method according to any one of the EEEs 38 to 44, wherein the channel pair dividing step further comprises, for each of the channels among the Y channels not being identified as the LFE channel, measuring, and/or importing from a previous measurement if any, at least one parameter used for the calculations that match the channels as pairs.

EEE 46. The method according to any one of the EEEs 38 to 45, wherein if the channel pairs are matched differently according to the feature(s) used to match them, a hierarchy of the feature(s) used determines which pairings to apply.

EEE 47. The method according to any one of the previous EEEs, wherein the channel pair dividing step continues pairing up any unpaired channel among the Y channels not being identified as the LFE channel until fewer than two channels remain.

EEE 48. The method according to any one of the previous EEEs, wherein the channel pair dividing step further comprises assigning the first received channel of the multi-channel audio signal within each pair as the left channel and the last listed channel within each pair as the right channel.

EEE 49. The method according to any one of the previous EEEs, wherein the division into pairs of channels and/or the assignment of the left and right channel if any is stored using metadata.

EEE 50. The method according to any one of the previous EEEs, wherein the center channel identification step further comprises calculating the independence and/or uncorrelation of any remaining unpaired channel among the Y channels not being identified as the LFE channel or divided into pairs compared to other channels among the Y channels and identifying the center channel as the most independent and/or uncorrelated channel.

EEE 51. The method according to EEE 50, wherein the calculation of independence and/or uncorrelation of any remaining unpaired channel among the Y channels not being identified as the LFE channel or divided into pairs is only calculated compared to channels divided into pairs.

EEE 52. The method according to EEE 50 or 51 depending on at least one of the EEEs 2 to 19, wherein the center channel identification step occurs after the channel pair differentiation step and the calculation of independence and/or uncorrelation of any remaining unpaired channel among the Y channels not being identified as the LFE channel or divided into pairs is only calculated compared to channels differentiated as the front pair.

EEE 53. The method according to any one of the previous EEEs, wherein the identification of the center channel is stored using metadata.

EEE 54. The method according to any one of the previous EEEs, further comprising calculating a confidence score for any of the results of the steps of the method, the confidence score being a measurement of how reliable the result is.

EEE 55. The method according to EEE 54, wherein if the time duration of the multi-channel audio signal is below a certain time duration threshold, the confidence score is multiplied by a weight factor less than one, so that a time duration less than the time duration threshold leads to a less reliable result.

EEE 56. The method according to EEE 55, wherein the weight factor is proportional to the time duration divided by the time duration threshold, so that a relatively longer time duration leads to a more reliable result.

EEE 57. The method according to EEE 55 or 56, wherein the weight factor is not applied or is equal to one if the time duration is longer than the time duration threshold.

EEE 58. The method according to any one of the EEEs 55 to 57, wherein the time duration threshold is a constant between 5-30 minutes.

EEE 59. The method according to any one of the EEEs 54 to 58, wherein the confidence score for the empty channel identification step is proportional to the sound energy of the identified empty channels, so that a relatively lower sound energy leads to a more reliable result.

EEE 60. The method according to any one of the EEEs 54 to 59, wherein the confidence score for the LFE channel determination step is proportional to the difference between the sub-band sound energy in the low frequency region and the sub-band sound energy in all the other frequency regions of the determined LFE channel, so that a relatively larger difference leads to a more reliable result.

EEE 61. The method according to EEE 60, wherein the difference between the sub-band sound energies is calculated by comparing the sum of the sub-band sound energies in the different frequency regions.

EEE 62. The method according to EEE 60 or 61, wherein the low frequency region comprises any sub-band below 200 Hz.

EEE 63. The method according to any one of the EEEs 54 to 62, wherein the confidence score for the LFE channel determination step is proportional to the sum of the sub-band sound energy of the determined LFE channel in frequency regions higher than a frequency threshold, so that a relatively lower sum leads to a more reliable result.

EEE 64. The method according to EEE 63, wherein the frequency threshold is 200 Hz or higher.

EEE 65. The method according to any one of the EEEs 54 to 64, wherein the confidence score for the LFE channel determination step is proportional to the highest frequency signal present in the determined LFE channel, so that a relatively lower highest frequency signal leads to a more reliable result.

EEE 66. The method according to any one of the EEEs 54 to 65, wherein the confidence score for the channel pair dividing step is proportional to a symmetry measure of the matched pair(s), so that a relatively high symmetry measure leads to a more reliable result.

EEE 67. The method according to any one of the EEEs 54 to 66, wherein the confidence score for the channel pair dividing step is proportional to a calculated inter-channel spectral distance between the matched pair(s), so that a relatively shorter distance leads to a more reliable result.

EEE 68. The method according to any one of the EEEs 54 to 67, wherein the confidence score for the channel pair dividing step is proportional to calculated inter-channel spectral distances between each channel in the matched pair(s) and the other channels among the Y channels not being identified as the LFE channel or being the matched channel, so that relatively long distances lead to a more reliable result.

EEE 69. The method according to any one of the EEEs 66 to 68, wherein at least a part of the channel pair dividing step is re-done with a different sub-band division when calculating inter-channel spectral distance if the confidence score for the step is below a confidence threshold.

EEE 70. The method according to any one of the EEEs 54 to 69, wherein the confidence score for the center channel identification step is proportional to the independence and/or uncorrelation of the identified center channel compared to the channels among the Y channels not being identified as the LFE channel, so that a relatively high independence and/or uncorrelation leads to a more reliable result.

EEE 71. The method according to any one of the EEEs 54 to 70, wherein the confidence score for the center channel identification step is proportional to calculated inter-channel spectral distances between the identified center channel and the other channels among the Y channels not being identified as the LFE channel, so that relatively symmetrical distances lead to a more reliable result.

EEE 72. The method according to any one of the EEEs 54 to 71, wherein the confidence score for the center channel identification step is directly proportional to the confidence score of the channel pair dividing step if it is present.

EEE 73. The method according to any one of the EEEs 54 to 72 depending on at least one of the EEEs 2 to 19, wherein a confidence score is calculated for the result of the channel pair differentiation step.

EEE 74. The method according to EEE 73, wherein the confidence score for the channel pair differentiation step is proportional to calculated inter-channel spectral distances between the identified center channel and the paired channels among the Y channels not being identified as the LFE channel, so that a relatively small inter-channel spectral distance between the front pair and the center channel leads to a more reliable result.

EEE 75. The method according to EEE 73 or 74, wherein the confidence score for the channel pair differentiation step is proportional to the directionality of the channels of the divided pairs, so that a relatively large difference between the directionality leads to a more reliable result.

EEE 76. The method according to any one of the EEEs 73 to 75, wherein the confidence score for the channel pair differentiation step is proportional to the directionality of the identified center channel and the channels of the divided pairs, so that a relatively small difference between the directionality of the center channel and one of the pairs leads to a more reliable result.

EEE 77. The method according to any one of the EEEs 73 to 76, wherein the confidence score for the channel pair differentiation step is proportional to the calculated inter-pair level difference of the channel pairs, so that a relatively high average level difference leads to a more reliable result.

EEE 78. The method according to any one of the EEEs 73 to 77, wherein the confidence score for the channel pair differentiation step is directly proportional to the confidence scores of the channel pair dividing step and/or the center channel identification step, if they are present.

EEE 79. The method according to any one of the EEEs 73 to 78 depending at least on EEE 4 or 5, wherein the confidence score for the channel pair differentiation step is proportional to the length of the selected one or more segments of the signal, so that a relatively long one or more segments leads to a more reliable result.

EEE 80. The method according to any one of the EEEs 73 to 79, wherein at least a part of the channel pair differentiation step is re-done with a different data segment if the confidence score for the step is below a confidence threshold.

EEE 81. The method according to any one of the EEEs 54 to 80, wherein if multiple calculation options for the confidence score for a certain step of the method are available, they are applied in a hierarchy.

EEE 82. The method according to any one of the EEEs 54 to 81, wherein the confidence score is stored using metadata.

EEE 83. The method according to any one of the EEEs 54 to 82, further comprising a display step (160) wherein the calculated confidence score(s) is/are displayed on a display (60).

EEE 84. The method according to EEE 83, wherein the display step further comprises displaying a warning if the calculated confidence score is below a confidence threshold.

EEE 85. The method according to any one of the previous EEEs, further comprising a display step wherein the identified channel layout is displayed.

EEE 86. The method according to any one of the EEEs 83 to 85, wherein the display step further comprises waiting for a user input using a user interface such as a button or a touch-screen.

EEE 87. The method according to EEEs 85 and 86, wherein the identified channel layout is approved by the user before being applied to the multi-channel audio signal.

EEE 88. The method according to EEE 87, wherein the user is not prompted to approve an identified channel layout being identical to the setting layout of the user.

EEE 89. The method according to any one of the EEEs 83 to 88, wherein the display step further comprises displaying a warning if the identified channel layout is different to the setting layout of the user.

EEE 90. The method according to EEE 89 depending on any one of the EEEs 54 to 82, wherein the warning level is proportional to the calculated confidence score(s).

EEE 91. The method according to any one of the EEEs 83 to 90, wherein the display step further comprises allowing a user to manipulate the displayed data.

EEE 92. The method according to EEE 91, wherein the manipulated data is used in the channel identification steps of the method.

EEE 93. The method according to any one of the EEEs 83 to 92, wherein the display step further comprises allowing a user to select at least one segment of the signal to ignore.

EEE 94. The method according to any one of the previous EEEs, further comprising a step of applying (170) the identified channel layout to the multi-channel audio signal.

EEE 95. The method according to EEE 94 depending on any one of the EEEs 54 to 82, wherein the identified channel layout is only applied if the calculated confidence score(s) exceed(s) a confidence threshold.

EEE 96. The method according to EEE 94 or 95, wherein the applying step comprises using any present metadata to apply the identified channel layout to the multi-channel audio signal.

EEE 97. The method according to any one of the previous EEEs, wherein the channel layout identified by the method is applied in real time to the multi-channel audio signal as it is being streamed to a speaker system.

EEE 98. The method according to any one of the previous EEEs, wherein the multi-channel audio signal is a multi-channel surround sound file or stream for content creation, analysis, transformation and playback systems.

EEE 99. The method according to any one of the previous EEEs, wherein at least one of the steps of the method uses machine learning based methods.

EEE 100. The method according to EEE 99, wherein the machine learning based methods are a decision tree, Adaboost, GMM, SVM, HMM, DNN, CNN and/or RNN.

EEE 101. A device configured for identifying channels of a multi-channel audio signal, the device (1) comprising circuitry configure to carry out the method (100) according to any one of the previous claims.

EEE 102. A computer program product comprising a non-transitory computer-readable storage medium with instructions adapted to carry out the method of any one of the EEE 1-EEE 100 when executed by a device (1) having processing capability.

What is claimed is:

1. A method for channel identification of a multi-channel audio signal comprising X>5 channels, the method comprising:

identifying, among the X channels, a subset of empty channels, thus resulting in a subset of Y≤X non-empty channels;

determining whether a low frequency effect (LFE) channel is present among the Y channels, and upon determining that an LFE channel is present, identifying the determined channel among the Y channels as the LFE channel;

dividing remaining channels among the Y channels not being identified as the LFE channel into a number of pairs of channels by matching symmetrical channels, the number of pairs being two or more pairs;

identifying a remaining unpaired channel among the Y channels not being identified as the LFE channel or belonging to the number of pairs as a center channel; and positionally differentiating the number of pairs to identify a front positional pair with respect to the center channel and a rear positional pair with respect to the center channel, wherein the positionally differentiating includes calculating inter-pair level differences among the number of pairs.

2. The method according to claim 1, wherein the rear positional pair is a surround positional pair, a back positional pair, or a side positional pair; and wherein the method further comprises identifying one or more additional rear positional pairs with respect to the center channel based on the calculated inter-pair level differences.

3. The method according to claim 1, wherein the positionally differentiating further includes evaluating directional consistency with the center channel for each pair of channels among the number of pairs.

4. The method according to claim 3, wherein the evaluating is performed when a highest inter-pair level difference among the number of pairs is below a level threshold value; and wherein the directional consistency represents a measure of similarity in a time domain related to a sound image direction.

5. The method according to claim 3, wherein a pair of channels characterized by a highest relative measure of the directional consistency among the number of pairs is differentiated as the front positional pair.

6. The method according to claim 1, wherein the identifying the subset of empty channels comprises measuring sound energy in each channel among the X channels, wherein a channel is identified as empty when its total sound energy is below an energy threshold.

7. The method according to claim 1, wherein it is determined that an LFE channel is present among the Y channels when a sum of sub-band sound energy in a low frequency region of a channel, being a sub-band below 200 Hz, is higher than a sum of sub-band sound energy in all other frequency regions in the channel.

8. The method according to claim 1, wherein the matching comprises calculating inter-channel spectral distances among the Y channels using a respective calculated sound energy distribution and a respective variance of each of the Y channels not identified as the LFE channel.

9. The method according to claim 1, wherein the dividing includes pairing up an unpaired channel among the Y channels not identified as the LFE channel until fewer than two unpaired channels remain.

10. The method according to claim 1, further comprising calculating a confidence score, the confidence score being a measurement of reliability, wherein when time duration of the multi-channel audio signal is below a time duration threshold, the confidence score is multiplied by a weight factor that is smaller than one.

11. The method according to claim 10, further comprising displaying a calculated confidence score on a display; and wherein a warning is displayed when the calculated confidence score is below a confidence threshold or when the identified front or rear positional pair differs from a corresponding channel layout setting of the user.

12. The method according to claim 1, further comprising applying to the multi-channel audio signal a channel layout that is based on the identified center channel, the identified LFE channel, the front positional pair, and the rear positional pair.

13. The method according to claim 12, wherein the channel layout is applied in real time when the multi-channel audio signal is being streamed to a speaker system.

14. The method according to claim 1, wherein the positionally differentiating further comprises averaging each of the calculated inter-pair level differences over a selected set of audio data segments.

15. The method according to claim 14, wherein the calculating includes selecting one or more audio data segments for the averaging based on a comparison of each of the calculated inter-pair level differences with a threshold value.

16. The method according to claim 15, further comprising increasing the threshold value and repeating the calculating with the increased threshold value.

17. The method according to claim 1, wherein the subset of empty channels has zero channels.

18. A device configured for identifying channels of a multi-channel audio signal, the device comprising circuitry configured to carry out the method according to claim 1.

19. A computer program product comprising a non-transitory computer-readable storage medium with instructions adapted to carry out the method of claim 1 when executed by a device having processing capability.

* * * * *